United States Patent
Azuma

(10) Patent No.: US 6,762,898 B2
(45) Date of Patent: Jul. 13, 2004

(54) MAGNETIC RECORDING AND PLAYBACK APPARATUS AND MAGNETIC RECORDING AND PLAYBACK METHOD

(75) Inventor: Yasunori Azuma, Kanagawa (JP)

(73) Assignee: Sony Corporation, Tokyo (JP)

( * ) Notice: Subject to any disclaimer, the term of this patent is extended or adjusted under 35 U.S.C. 154(b) by 376 days.

(21) Appl. No.: 09/934,737

(22) Filed: Aug. 22, 2001

(65) Prior Publication Data

US 2002/0067564 A1 Jun. 6, 2002

(30) Foreign Application Priority Data

Aug. 23, 2000 (JP) ........................................ 2000-258106

(51) Int. Cl.⁷ ............................................. G11B 15/18
(52) U.S. Cl. ......................... 360/72.2; 360/69; 360/48
(58) Field of Search ........................ 360/48, 72.1, 72.2, 360/69, 71, 74.1, 74.4

(56) References Cited

U.S. PATENT DOCUMENTS 5,384,673 A * 1/1995 Yoshioka et al. .......... 360/72.2
6,307,700 B1 * 10/2001 Takayama ................... 360/72.2

* cited by examiner

Primary Examiner—Andrew L. Sniezek
(74) Attorney, Agent, or Firm—Frommer Lawrence & Haug LLP; William S. Frommer

(57) ABSTRACT

The invention provides a magnetic recording and playback apparatus and method which can access a magnetic tape in a significantly reduced time when applied, for example, to a tape streamer for backing up data of a server. In the magnetic recording and playback apparatus, data necessary for accessing to a magnetic tape and part of user data recorded on the magnetic tape are recorded at a predetermined position of the magnetic tape, and then the magnetic tape is discharged.

17 Claims, 16 Drawing Sheets

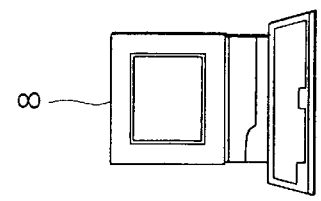
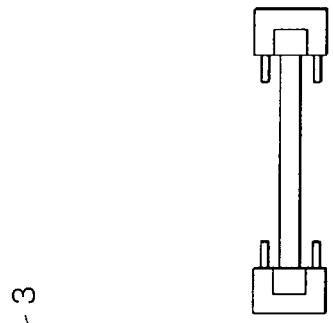
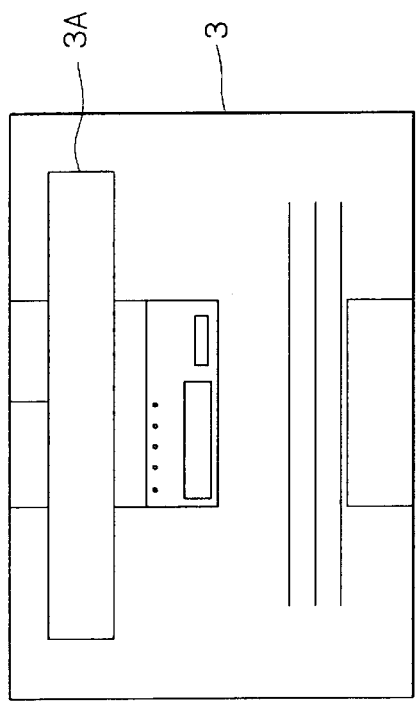
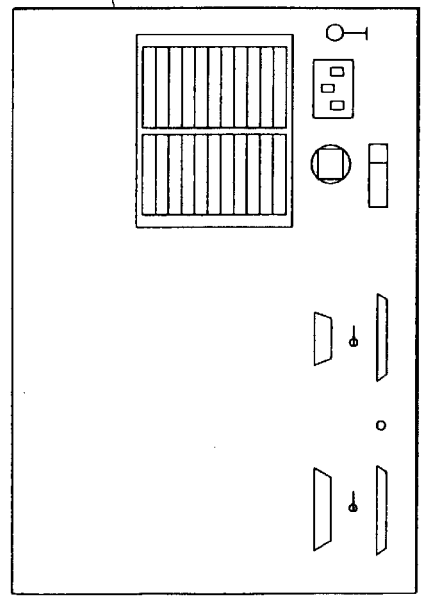
FIG. 3A
FIG. 3B

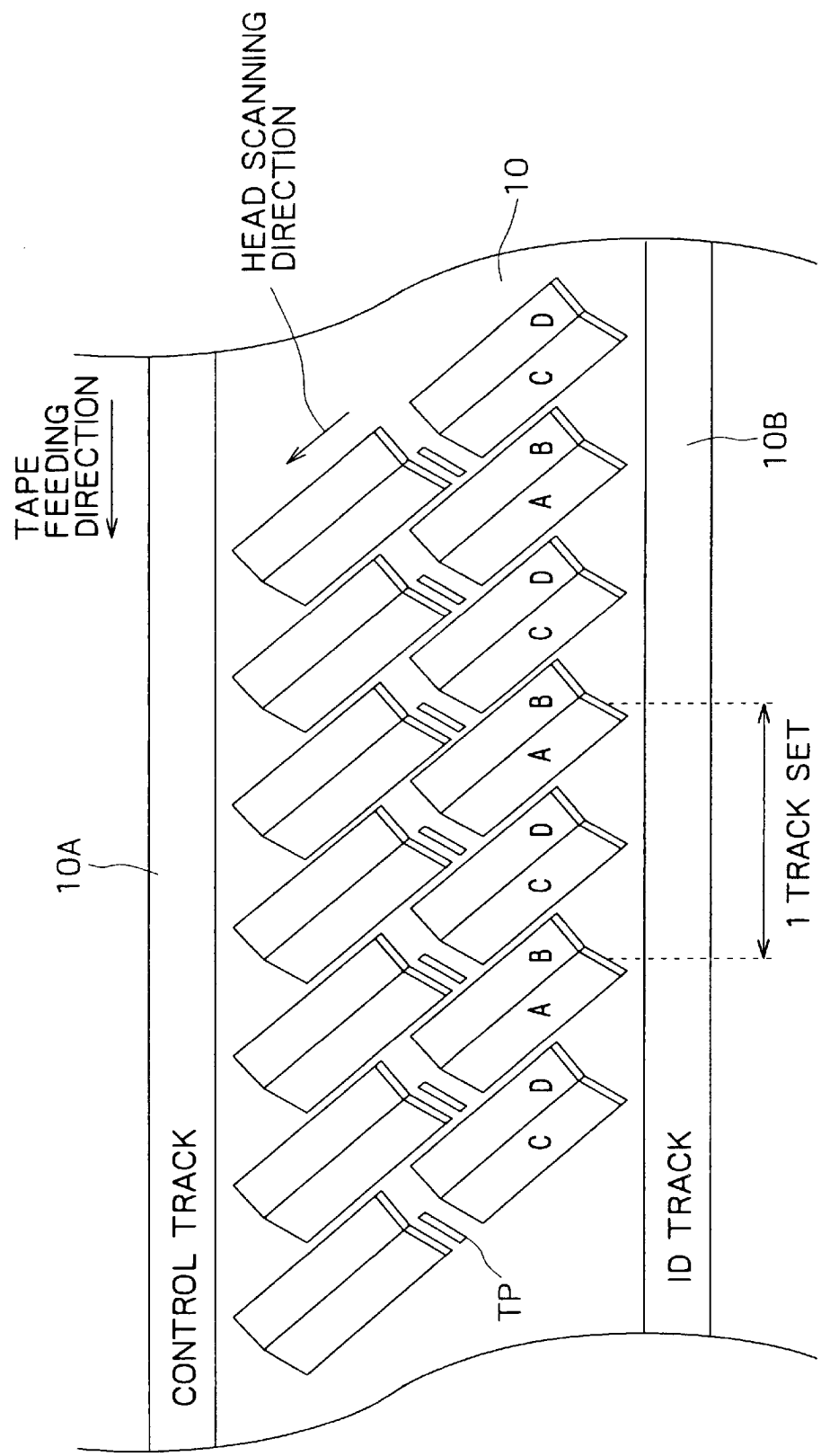

FIG. 10

VIT

| BYTES WORD | (MSB) BYTE 3 | BYTE 2 | BYTE 1 | (LSB) BYTE 0 |
|---|---|---|---|---|
| 0~3 | RESERVED (=00000000) | | | |
| 4~43 | VOLUME LABEL | | | |
| 44 | TOP PHYSICAL ID OF DATA BLOCK (=TOP ID OF USER AREA) | | | |
| 45 | END PHYSICAL ID OF DATA BLOCK (=POSITION OF EOD) | | | |
| 46 | END ABN OF DATA BLOCK (=ABN CORRESPONDING TO EOD) | | | |
| 47~64 | RESERVED (=00000000) | | | |
| 65 | UIT AVAILABLE FLAG (ALL "0s" OR ALL "1s") | | | |
| 66~254 | RESERVED (=00000000) | | | |
| 255 | VOLUME NO. UPON INITIALIZATION | | | |
| 256 | OVERWRITE COUNTER | | | |
| 257 | LIDT AVAILABLE FLAG (=ffffffff) | | | |
| 258 | BLOCK OPERATION FORM (=ffffffff) | | | |
| 259 | FORMAT FORM (=00000001) | | | |
| 260 | ECC FORM (=00000002) | | | |
| 261 | CREATE TIME OF VOLUME (=00000000) | | | |
| 4096 | UNIT FORM (=00000001) | | | |
| 8192~8215 | MOUNT INFORMATION | | | |
| 16384 | TOTAL OF READ RETRIES | | | |
| 16385 | TOTAL OF RECOVERIES | | | |
| 16386 | RECOVERY FAILURE FLAG (=00000000) | | | |

FIG. 11

| BYTE WORD | (MSB) BYTE 3 | BYTE 2 | BYTE 1 | (LSB) BYTE 0 |
|---|---|---|---|---|
| 0~3 | LOGICAL ID ADDRESS | | | |
| | PHYSICAL ID ADDRESS | | | |
| | FILE NO. | | | |
| | ABSOLUTE BLOCK NO. | | | |

LIDT

FIG. 12

FIT

| BYTE WORD | (MSB) BYTE 3 | BYTE 2 | BYTE 1 | (LSB) BYTE 0 |
|---|---|---|---|---|
| 0~1 | PHYSICAL ID ADDRESS OF TAPE MARK #1 | | | |
| | ABSOLUTE BLOCK NO. OF TAPE MARK #1 | | | |
| 3 | RESERVED (=00000000) | | | |
| 4~5 | PHYSUCAL ID ADDRESS OF TAPE MARK #20 | | | |
| | ABSOLUTE BLOCK NO. OF TAPE MARK #2 | | | |
| 6 | RESERVED (=00000000) | | | |
| P, 0 | PHYSICAL ID ADDRESS OF TAPE MARK #N | | | |
| | ABSOLUTE BLOCK NO. OF TAPE MARK #N | | | |
| Z | RESERVED (=00000000) | | | |

MAGNETIC RECORDING AND PLAYBACK APPARATUS AND MAGNETIC RECORDING AND PLAYBACK METHOD

BACKGROUND OF THE INVENTION

This invention relates to a magnetic recording and playback apparatus and a magnetic recording and playback method, and more particularly to a magnetic recording and playback apparatus and a magnetic recording and playback method which can be applied to a tape streamer for backing up data of a server or the like.

Conventionally, tape streamers are divided into two types including a one-reel type and a two-reel type. In tape streamers of both types, a title of a magnetic tape, file names recorded on the magnetic tape and other information are recorded at the top of the magnetic tape, and the data recorded in the top area of the magnetic tape are used as management data to allow accessing to a physical volume recorded following the top area. Further, in the tape streamers, a logical volume is defined in an area defined by the physical volume, and a user area is set in the logical volume.

Therefore, in a tape streamer which employs such a format as just described, if desired data are recorded onto a magnetic tape, then the magnetic tape is rewound and the management data recorded in the top area of the physical volume are updated. Further, after the magnetic tape is loaded into the tape streamer, the tape streamer first accesses the top area of the magnetic tape to acquire its management data.

It is considered that a conventional tape streamer of the two-reel type can reduce the time required for loading and unloading of a magnetic tape if an IC tag is adhered to the tape cassette and management data recorded at the top of the magnetic tape are recorded into the IC tag.

In particular, in the tape streamer having the configuration just described, if management data are recorded not into the top area of the magnetic tape but into the IC tag upon unloading of the magnetic tape, then it is possible to feed the magnetic tape to the nearer side of the top and the tail of the magnetic tape to unload the magnetic tape. This can reduce the time required for unloading when compared with an ordinary unloading method wherein the magnetic tape is rewound to the top thereof without fail. Further, upon subsequent loading, if the management data recorded in the IC tag are read out, then the user area of the magnetic tape can be accessed even if the magnetic tape is not rewound to the top thereof. Consequently, the time required for loading can be reduced. Further, if free time or the like is made most of to update the management data recorded in the top area of the magnetic tape so as to correspond to the management data recorded in the IC tag, then the magnetic tape can be accessed correctly also by another tape streamer which is not ready for the use of such an IC tag as described above.

Such IC tags as described above are divided into two types including a non-contact type and a contact type. An IC tag of the contact type, however, has a drawback in that soiling to terminals of the IC tag or the like sometimes disables reading out of information recorded in the IC tag. Further, where the IC tag is transported from a storage place thereof by a transport apparatus and automatically loaded into a tape streamer, it is difficult to read out information recorded in the IC tag during the storage or the transportation. Therefore, the IC tag of the contact type has another drawback in that the information recorded on the magnetic tape cannot be acquired if the tape cassette is not loaded actually into a tape streamer. In contrast, where an IC tag of the non-contact type is used, deterioration of the reliability originating from soiling to terminals or the like can be eliminated effectively. Further, if a reader-writer is placed on a rack, a transport apparatus or the like, then such an operation as to confirm a tape cassette to be loaded into a tape streamer before it is loaded actually can be carried out.

However, most of application programs for driving a tape streamer are so designed as to record data of an identification code of a magnetic tape and so forth into the top area of the user area of the magnetic tape and then access the data of the identification code and so forth when accessing to the user area is started. Therefore, also where such an IC tag as described above is utilized, in order to actually start accessing to the magnetic tape when the magnetic tape is loaded, it is necessary to rewind the magnetic tape to the top thereof after all. Therefore, the accessing to the magnetic tape requires time as much.

One of possible solutions to this problem may be to additionally record data of an identification code and so forth relating to such an application program as described above (such data are hereinafter referred to as management data by an application program) into the IC tag. This, however, necessitates modification to the application program so as to be ready for such a change in specifications, and existing application programs cannot be applied as they are. Incidentally, a very high degree of reliability is required for a tape streamer, and it is considered necessary to avoid modification to an application program for backup as far as possible if the application program has exhibited favorable results.

SUMMARY OF THE INVENTION

It is an object of the present invention to provide a magnetic recording and playback apparatus and a magnetic recording and playback method which can access a magnetic tape in a significantly reduced time.

In order to attain the object of the present invention, according to an aspect of the present invention, there is provided a magnetic recording and playback apparatus for successively forming slant tracks on a magnetic tape and recording user data onto the slant tracks, comprising means for recording data necessary for accessing to the magnetic tape and part of the user data recorded on the magnetic tape at a predetermined position of the magnetic tape, and means for discharging the magnetic tape.

According to another aspect of the present invention, there is provided a magnetic recording and playback method for successively forming slant tracks on a magnetic tape and recording user data onto the slant tracks, comprising the steps of recording data necessary for accessing to the magnetic tape and part of the user data recorded on the magnetic tape at a predetermined position of the magnetic tape, and discharging the magnetic tape.

In the magnetic recording and playback apparatus and the magnetic recording and playback method, data necessary for accessing to a magnetic tape and part of user data recorded on the magnetic tape are recorded at a predetermined position of the magnetic tape, and the magnetic tape is discharged. Consequently, immediately after the magnetic tape is loaded subsequently, the data necessary for accessing to the magnetic tape can be acquired in a short time, and accessing to the magnetic tape can be started in a shorter time as much. Further, the part of the user data recorded on the magnetic tape can be acquired in the proximity of the position at which the magnetic tape is loaded. Therefore, if the part of the user data are set to data which are required at an initial stage by an application program or to data accessing to which occurs in a comparatively high frequency, then the data can be provided to a host apparatus without feeding and accessing the magnetic tape every time. Consequently, the time required for accessing to the magnetic tape can be reduced significantly when compared with the prior art.

The above and other objects, features and advantages of the present invention will become apparent from the following description and the appended claims, taken in conjunction with the accompanying drawings in which like parts or elements denoted by like reference symbols.

BRIEF DESCRIPTION OF THE DRAWINGS

FIGS. 3A and 3B are a front elevational view and a rear elevational view, respectively, showing a tape streamer of the backup system of FIG. 1;

FIG. 4 is a diagrammatic view illustrating a recording format used by the tape streamer of FIGS. 3A and 3B;

FIG. 10 is a diagrammatic view illustrating a volume information table;

FIG. 11 is a diagrammatic view illustrating a logical ID table;

FIG. 12 is a diagrammatic view illustrating a file information table;

DESCRIPTION OF THE PREFERRED EMBODIMENTS

1. Configuration of the Embodiment
1-1. General Configuration

Figure 1:
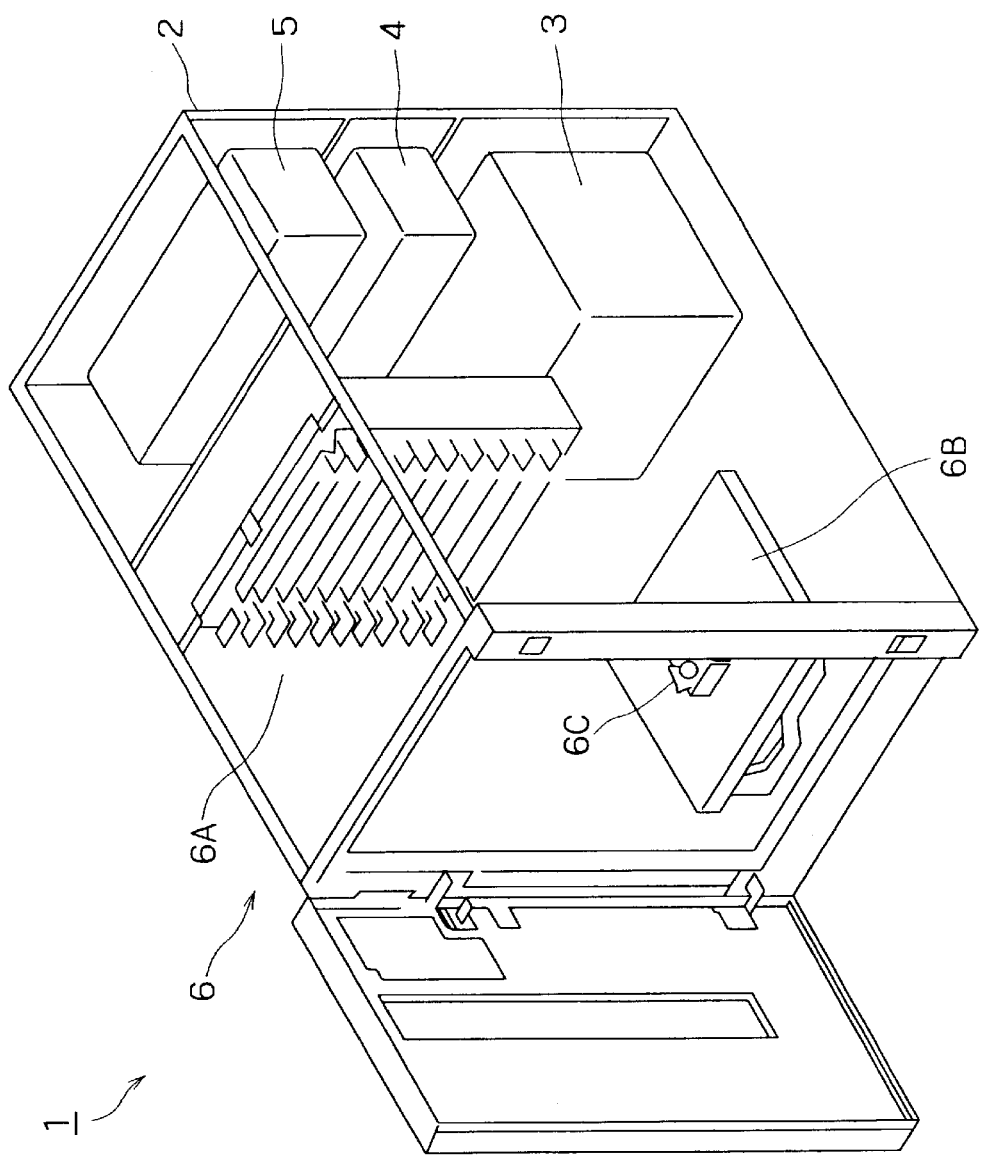
FIG. 1 is a perspective view showing a backup system to which the present invention is applied.

Referring first to FIG. 1, there is shown a backup system to which the present invention is applied. The backup system is generally denoted at 1 and includes a tape streamer 3 and other necessary components disposed in a console 2 of a large size. More particularly, the tape streamer 3, a power supply unit 4 and a CPU unit 5 are disposed from below at a front portion of the console 2, and a transport mechanism 6 for a tape cassette 45 (refer to FIG. 14) is disposed on the rear side of the console 2.

The power supply unit 4 supplies power to the components of the backup system 1, and the CPU unit 5 controls operation of the entire backup system 1. The tape streamer 3 records data supplied thereto from a host computer not shown into a tape cassette 45 loaded into the tape streamer 3 by the transport mechanism 6, and plays back data recorded in the tape cassette 45 and outputs the data to the host computer.

The transport mechanism 6 includes a rack 6A configured so as to receive a plurality of tape cassettes 45 thereon, and transports and loads one of the tape cassettes 45 held on the rack 6A to and into the tape streamer 3 under the control of the CPU unit 5. Further, the transport mechanism 6 conversely transports a tape cassette 45 discharged from the tape streamer 3 back to the original rack 6A. To this end, the transport mechanism 6 includes an elevator 6B and a hand block 6C disposed therein. The elevator 6B is mounted for movement in upward and downward directions of the console 2. The hand block 6C is carried on the elevator 6B, and carries a tape cassette 45 onto and from the rack 6A and further onto and from the tape streamer 3. The tape cassette 45 applied to the tape streamer 3 according to the embodiment of the present invention has an IC tag of the non-contact type and a bar code disposed on the back face thereof, and corresponding to them, a reader-writer for accessing the IC tap and a bar code reader for reading the bar code disposed on the tape cassette 45 are disposed on the rack 6A. Further, another reader-writer for the IC tag is disposed on the elevator 6B.

Figure 2:
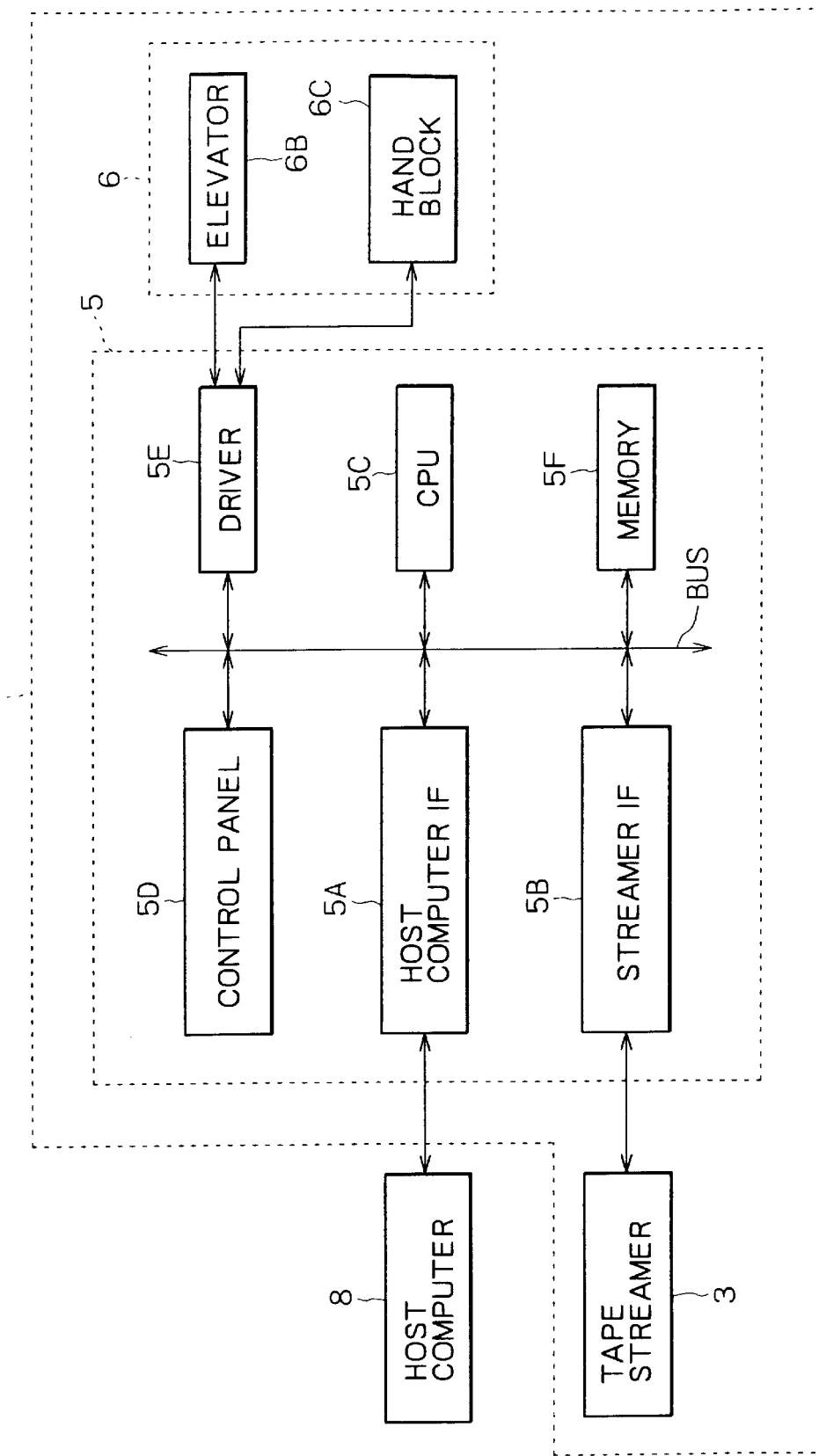
FIG. 2 is a block diagram showing the backup system of FIG. 1.

Referring now to FIG. 2, the CPU unit 5 is shown together with associated elements. The CPU unit 5 includes a host computer interface (host computer IF) 5A which is connected to a host computer 8, for example, by a SCSI (Small Computer System Interface) such that it fetches a command and data to be used for recording from the host computer 8 and outputs them to an internal bus BUS and conversely outputs status data for the host computer 8 outputted from the internal bus BUS, data obtained by playback and so forth to the host computer 8.

A streamer interface (streamer IF) 5B is connected to the tape streamer 3, for example, by a SCSI such that it outputs a predetermined control command outputted to the internal bus BUS and data to be recorded to the tape streamer 3, and conversely outputs status data outputted from the tape streamer 3, data obtained by playback and so forth from the tape streamer 3 and outputs the received data to the internal bus BUS.

A control panel 5D is disposed in front of the console 2, and accepts various operations by the operator and notifies a central processing unit (CPU) 5C of such operations by the operator through the internal bus BUS. A driver 5E drives the elevator 6B and the hand block 6C under the control of the central processing unit 5C.

The central processing unit 5C assures a working area in a memory 5F and executes a predetermined processing procedure to control operation of the entire backup system 1 in accordance with a command from the host computer 8. In particular, if an access command is inputted from the host computer 8, then the central processing unit 5C issues an instruction to the tape streamer 3 to record or play back a tape cassette 45. In this instance, if the access command from the host computer 8 is for a tape cassette 45 different from the tape cassette 45 currently loaded in the tape streamer 3, then the central processing unit 5C controls the transport mechanism 6 to load the corresponding tape cassette 45 into the tape streamer 3. On the other hand, if an instruction to format a virgin tape is issued by the operator, then the central processing unit 5C controls the transport mechanism 6 to load a tape cassette 45 into the tape streamer 3 and issues an instruction to the tape streamer 3 to perform an initialization process for the tape cassette 45.

1-2. Configuration of the Tape Streamer

FIGS. 3A and 3B show the front and the rear of the tape streamer 3, respectively. The tape streamer 3 has a slot 3A formed in the front wall thereof as seen in FIG. 3A. A tape cassette 45 can be inserted into and discharged from the tape streamer 3 through the slot 3A. The tape streamer 3 further has various connectors disposed on the rear wall thereof such that it can be connected directly to the host computer 8, for example, with the CPU unit 5 omitted.

1-2-1. Format by the Tape Streamer

FIG. 4 illustrates a format of recording tracks by the tape streamer 3. Referring to FIG. 4, according to the format illustrated, longitudinal tracks are formed on upper and lower edges of a magnetic tape 10 in FIG. 4, and slant tracks are formed between the longitudinal tracks. One of the upper and lower longitudinal tracks is applied to a control track 10A on which a control signal for tracking control is recorded. The other longitudinal track is allocated to an ID track 10B on which information for management of the slant tracks is recorded in accordance with a management table.

On the other hand, the slant tracks are formed such that a pair of recording tracks having positive and negative azimuth angles successively appear. Each of the slant tracks is formed such that it is cut into two portions at a substantially central portion thereof, and a preceding recording track of each pair of recording tracks has a region TP formed at the central cut portion thereof. A pilot signal for tracking control is recorded in the region TP.

Further, the slant tracks are formed in a unit of a track set which includes two pairs of recording tracks, that is, four recording tracks. Each track set has a track set ID set thereto for use for identification of the track set. The track set ID is allocated to part of information recorded on the ID track 10B. It is to be noted that the track set ID includes a physical track set ID having a value which increases monotonously among all track sets and a logical track set ID having a value which increases monotonously except dummy tracks, EOD tracks and so forth. Further, the track set ID is converted into a time code according to the SMPTE and recorded as such onto the ID track 10B.

In each track set of the slant tracks, the tracks are allocated to an A track, a B track, a C track and a D track corresponding to different channels of a recording and playback system from the leading side of the track set.

The track sets are classified into user track sets to be used for recording of user data, tape mark track sets allocated to tape marks representative of breakpoints of files, an EOD (End Of Data) track set representative of the last end of data, dummy track sets which form dummy tracks, and so forth.

Figures 5A, 5B:
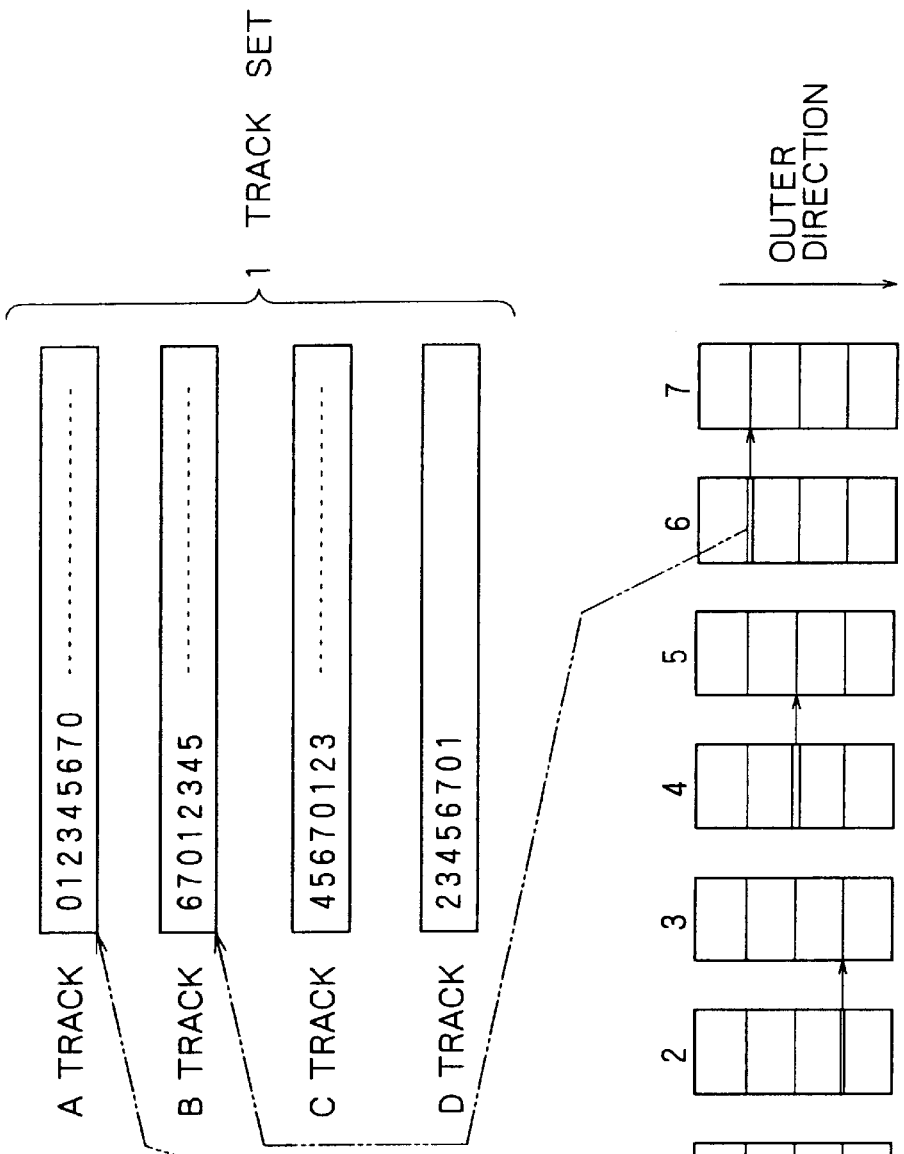
FIGS. 5A and 5B are diagrammatic views illustrating interleaving of tracks by the tape streamer of FIGS. 3A and 3B.

FIGS. 5A and 5B illustrate a relationship between a track set formed in this manner and an ECC (Error Correct Code) block which is a unit for an error correction process. The tape streamer 3 delimits user data or the like to be recorded in a unit of a predetermined block and adds an error correction code to the block to form an ECC block. The tape streamer 3 allocates data of eight ECC blocks to one track set. In this instance, each of the ECC blocks represented by numerals, 0 to 7 is equally divided in the direction of an outer parity and allocated to different tracks such that the ECC blocks are recorded in an inter-track interleaved relationship. Further, data allocated to the tracks are re-arranged such that they are recorded in a word-interleaved relationship.

Figure 6:
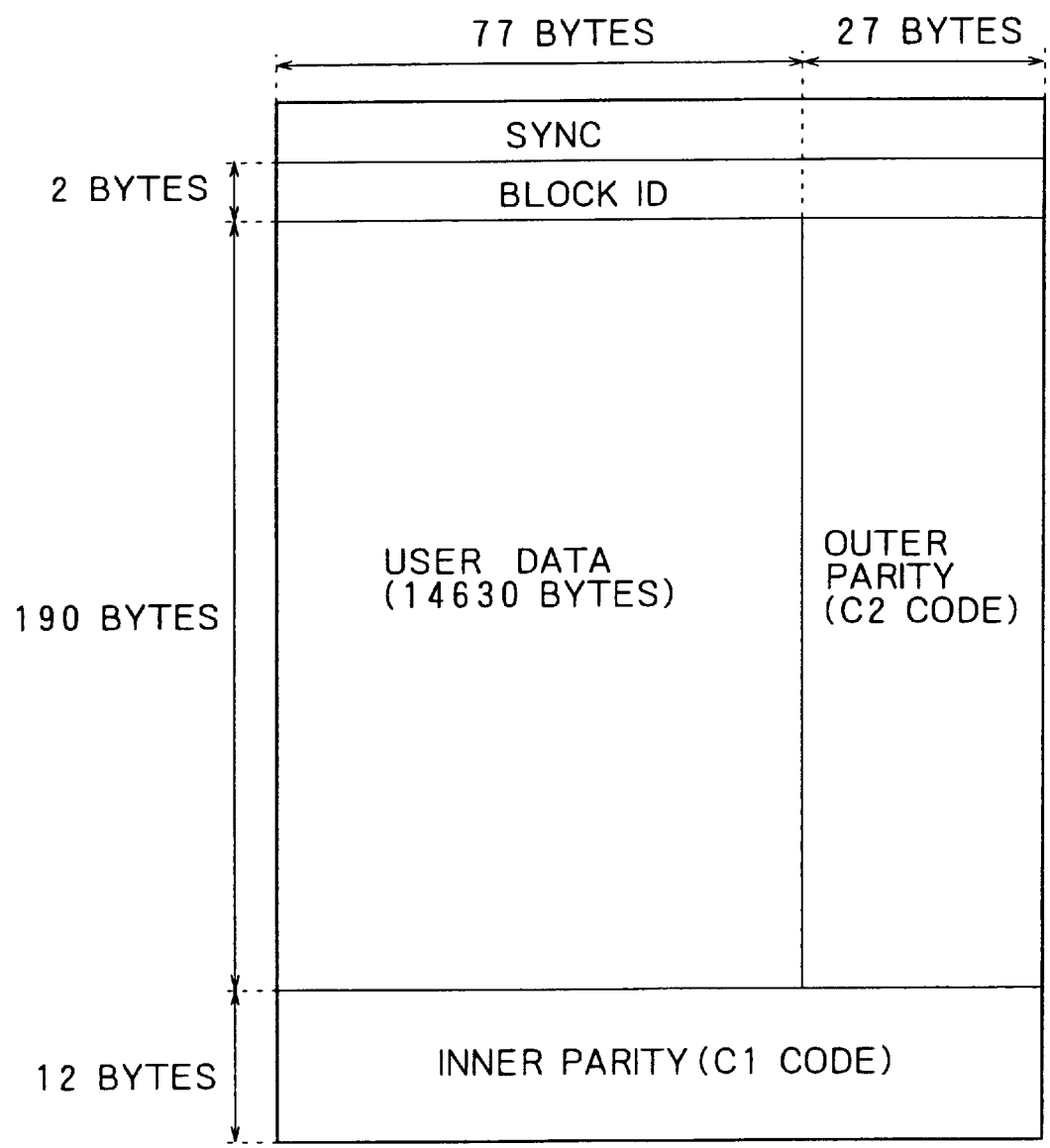
FIG. 6 is a diagrammatic view illustrating an error correct code block used in the tape streamer of FIGS. 3A and 3B.

FIG. 6 illustrates an ECC block. Referring to FIG. 6, user data and so forth of 77×190 bytes are allocated to one ECC block, and an outer parity of 27 bytes is produced for a data string of 77 bytes and added to the data string. Further, a block ID of 2×104 bytes is added, and an inner parity of 12 bytes is produced for data strings of 192 bytes including the block ID in a direction perpendicular to that of the outer parity and is added to the data strings.

Thus, the ECC block has error correction codes in the form of product codes added thereto and further has a synchronizing pattern SYNC of 4×104 bytes added thereto. It is to be noted that the block ID here is an ID for identification of the ECC block, and the synchronizing pattern SYNC is a particular pattern indicative of the start of the ECC block.

From the foregoing, the tape streamer 3 can allocate user data and so forth of 117,040 bytes to one track set since eight ECC blocks to each of which user data and so forth of 77×190 bytes are allocated are allocated to one track set.

Figure 7:
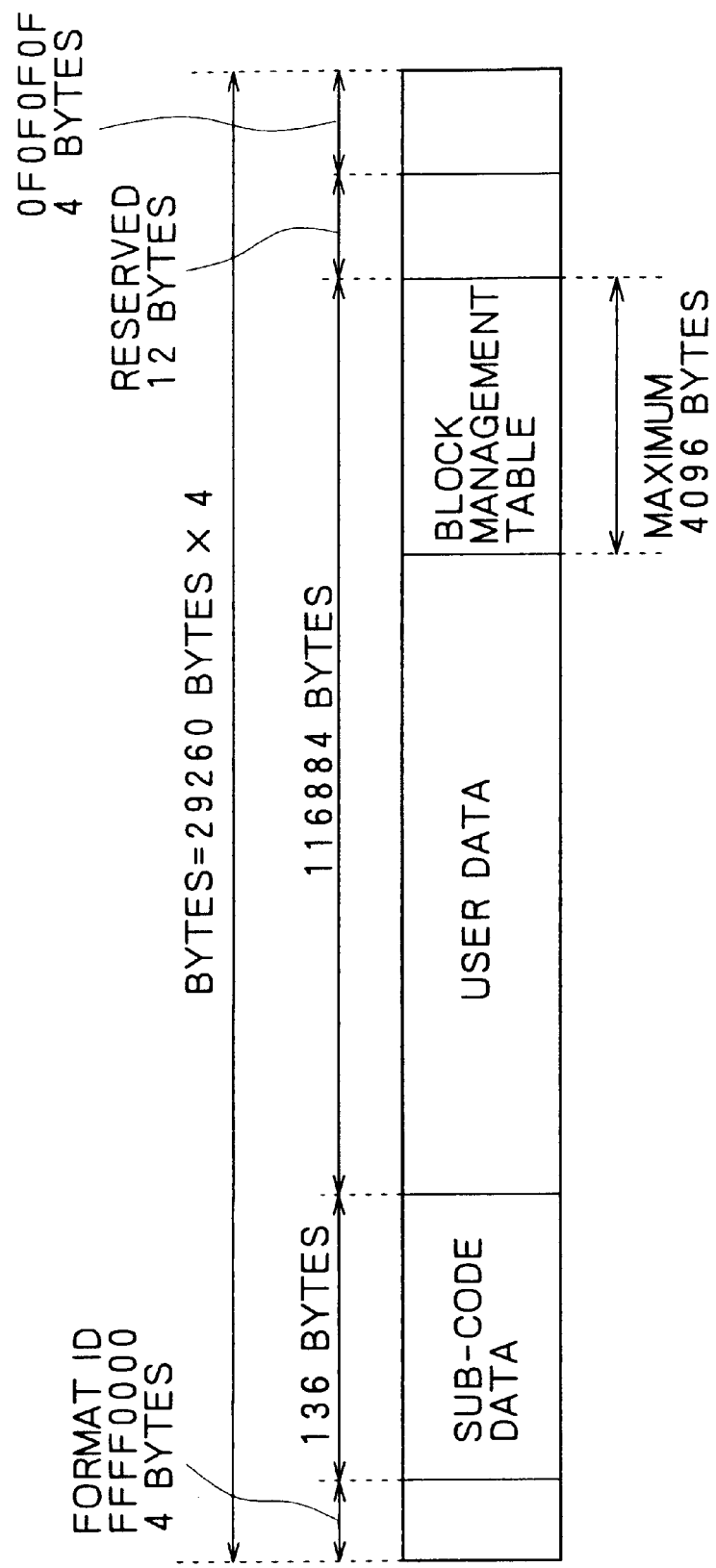
FIG. 7 is a diagrammatic view illustrating a track set used by the tape streamer of FIGS. 3A and 3B.

FIG. 7 illustrates a data configuration of 117,040 bytes allocated to one user data track set. Referring to FIG. 7, one track set has a format ID of 4 bytes disposed at the top thereof. Here, the format ID is an ID for identification of the format. In the data configuration illustrated in FIG. 7, the value of FFFF0000h representing that user data are recorded in a track set including four tracks is described as the format ID.

Sub code data are allocated to the following 136 bytes, and tables such as a VSIT, a VLT and a BST which are hereinafter described, identification data for the user data track sets and tape mark track sets, logical track set IDs and so forth are allocated to and data for management of the track sets, logical track set IDs and so forth are recorded in the 136 bytes.

The number of bytes except the data length of a block management table from the following 116,884 bytes is allocated to recording of user data and so forth. When user data are allocated to this area, if the area cannot be filled with user data, then dummy data are allocated.

The block management table is set to 4,096 bytes in the maximum. The tape streamer 3 is designed so as to record and play back data in a unit of a block which is a set of track sets, and a table to be used for management of such blocks is recorded in the block management table. The following 12 bytes of the track set are allocated to reservation, and the remaining 4 bytes are set to the EOD (End Of Data) representative of the end of the one track set.

The tape streamer 3 records user data and records data to be used for management in a basic unit of a track set in this manner.

Figure 8:
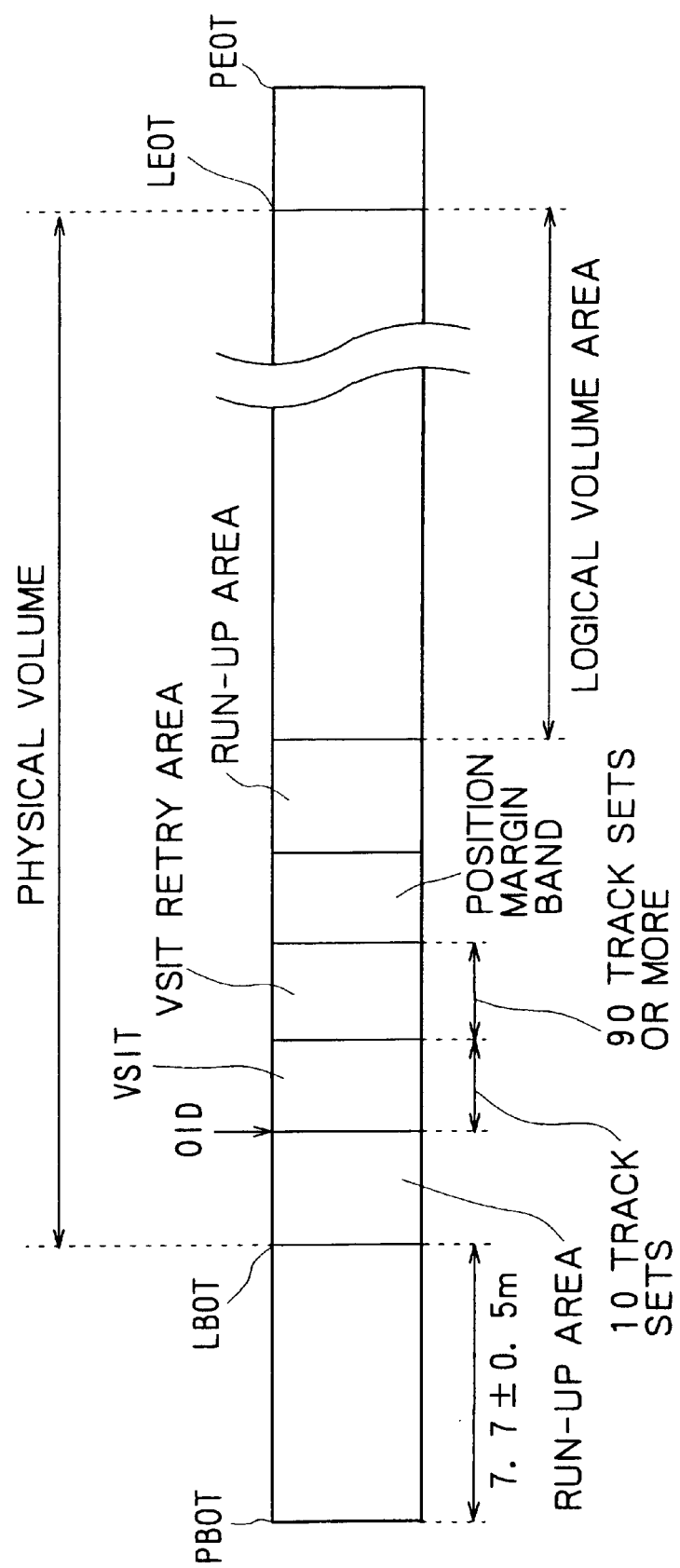
FIG. 8 is a similar view but illustrating a physical volume of an entire magnetic tape used in the tape streamer of FIGS. 3A and 3B.

FIG. 8 illustrates a layout of the entire magnetic tape 10. Referring to FIG. 8, the magnetic tape 10 has a LBOT (Logical Beginning of Table) set at a position thereof spaced by a predetermined distance from the PBOT (Physical Beginning Of Tape) of the physical magnetic tape 10 except a leader tape connected to a reel when the magnetic tape 10 is fed. Further, the LEOT (Logical End Of Tape) is set at a position of the magnetic tape 10 spaced similarly toward the feeding start point side of ha the magnetic tape 10 from the physical PEOT (Physical End Of Tape). The magnetic tape 10 has various data recorded on a portion thereof between the LBOT and the LEOT and is used except regions thereof in the proximity of the leader tapes in which it is comparatively liable to exhibit deterioration in terms of the error rate. The portion of the magnetic tape 10 between the LBOT and the LEOT forms a physical volume.

The magnetic tape 10 has a run-up area formed thereon over a predetermined distance from the LBOT such that a magnetic tape feeding system can be servo locked within the run-up area. To this end, the magnetic tape 10 has slant tracks successively formed thereon beginning with the run-up area.

A VSIT (Volume Set Table) is recorded subsequently to the run-up area on the magnetic tape 10. The top physical track set ID on which the VSIT is recorded is set to 0ID. In the VSIT, various data for managing logical volumes between the LBOT and the LEOT are recorded. In particular, in the VSIT, a volume name of the magnetic tape, the number of files recorded on the magnetic tape, the names of the files, physical track set IDs of VITs allocated to the files, and so forth are recorded. The tape streamer 3 can access the VSIT to discriminate the magnetic tape 10 and confirm files, recorded positions of the files and so forth recorded on the magnetic tape 10. The VSIT is formed from one track set (1ID), and the same contents of the VSIT are repetitively recorded 10 times so as to assure a high degree of reliability.

Next to the VSIT recording area, a VSIT retry area for 90 IDs is formed on the magnetic tape 10 so that, when necessary, the VSIT can be re-recorded in the retry area so that a recovery process or the like can be executed.

Next to the VSIT retry area, a position margin band area for a predetermined number of IDs is formed on the magnetic tape 10 so that, even if the VSIT is updated, this does not have any influence on data recorded in the succeeding areas. A portion of the magnetic tape 10 from the position margin band area to the LEOT is allocated to a logical volume area.

Figure 9A:
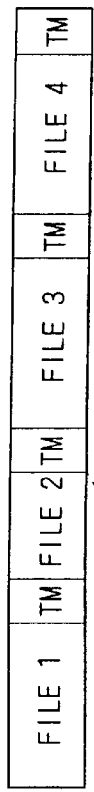
FIGS. 9A to 9E are diagrammatic views illustrating volumes used by the tape streamer of FIGS. 3A and 3B.
Figure 9B:
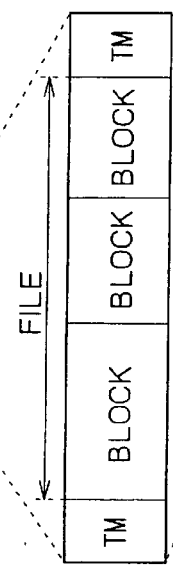
Figure 9C:
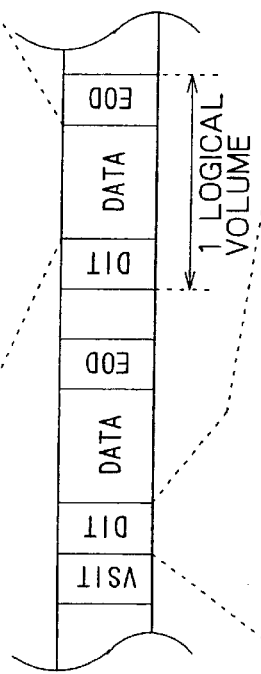

FIGS. 9A to 9E illustrate logical volumes allocated to the logical volume area. On the magnetic tape 10, data are recorded in a unit of a file across a tape mark TM which is a delimiter code of a file (FIG. 9A). Each file is formed from several blocks (FIGS. 9B and 9C).

Figure 9D:
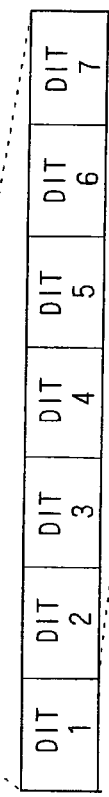

According to the tape streamer 3, a unit including a file, a DIT (Directory Information Table) and an EOD (End Of Data) forms a logical volume. The DIT is a table used for management of the logical volume to which the DIT is allocated and has a length including 40 IDs. In the DIT, the same contents of such 40 IDs are recorded repetitively seven times as seen in FIG. 9D so that a high degree of reliability can be assured.

The run-up area described hereinabove with reference to FIG. 8 is applied to the top of each DIT so that a servo system can be locked. The run-up area is followed by a position margin band so that, similarly to the VSIT, even if the DIT is updated, it does not have any influence on recorded data in the succeeding areas.

Figure 9E:
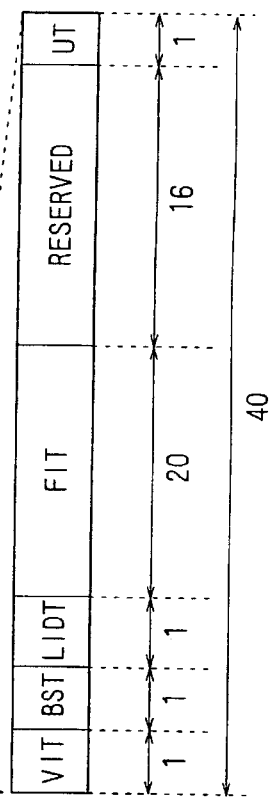

The DIT includes, as seen in FIG. 9E, a VIT (Volume Information Table) of 1 ID, a BST (Bad Spot Table) of 1 ID, an LIDT (Logical ID Table) of 1 ID, an FIT (File Information Table) of 20 IDs, and a UIT (User Information Table) of 1 ID. The remaining 16 IDs of the DIT are set as reserved.

If the physical track set ID is recorded in the VSIT, then the VIT can be accessed with reference to the record of the VSIT, and further, the entire DIT can be accessed. It is to be noted that the logical track set ID is set to the VIT so that it may coincide with the physical track set ID. As seen in FIG. 10, a volume label to which the DIT is allocated, the first physical track set ID and the last physical track set ID of the user track set are allocated to the VIT.

Referring back to FIG. 9E, to the BST, position information of an area (hereinafter referred to as bad spot) which has been determined as an area which is difficult to use by the tape streamer 3 due to damage to the magnetic tape 10 or the like is allocated. In particular, if a bit error whose correction is difficult upon a read-after-write or retry process upon recording is detected, then the tape streamer 3 re-records data for the area and succeeding areas onto the magnetic tape. The tape streamer 3 defines the area into which the data re-recorded on the magnetic tape in this manner should originally be recorded as a bad spot. In the BST, a physical track set ID of a starting end and a physical track set ID of a last end of such a bad spot as just described are recorded.

The LIDT (Logical ID Table) is used for high speed search for each block and has data of a file number, a physical track set ID and a block number recorded therein for each 200 logic track set IDs as seen in FIG. 11. Consequently, the tape streamer 3 can roughly detect the position of a block of an object of accessing and find out the position at a high speed.

The FIT includes records of physical track set IDs of tape marks and block numbers of blocks as seen in FIG. 12. The UT is information representative of whether or not the volume has been updated, and status data representative of whether or not such updating has been performed exhibits a value FFFFFFFFh before such updating is performed, but exhibits another value 00000000h after such updating is performed.

Figure 13:
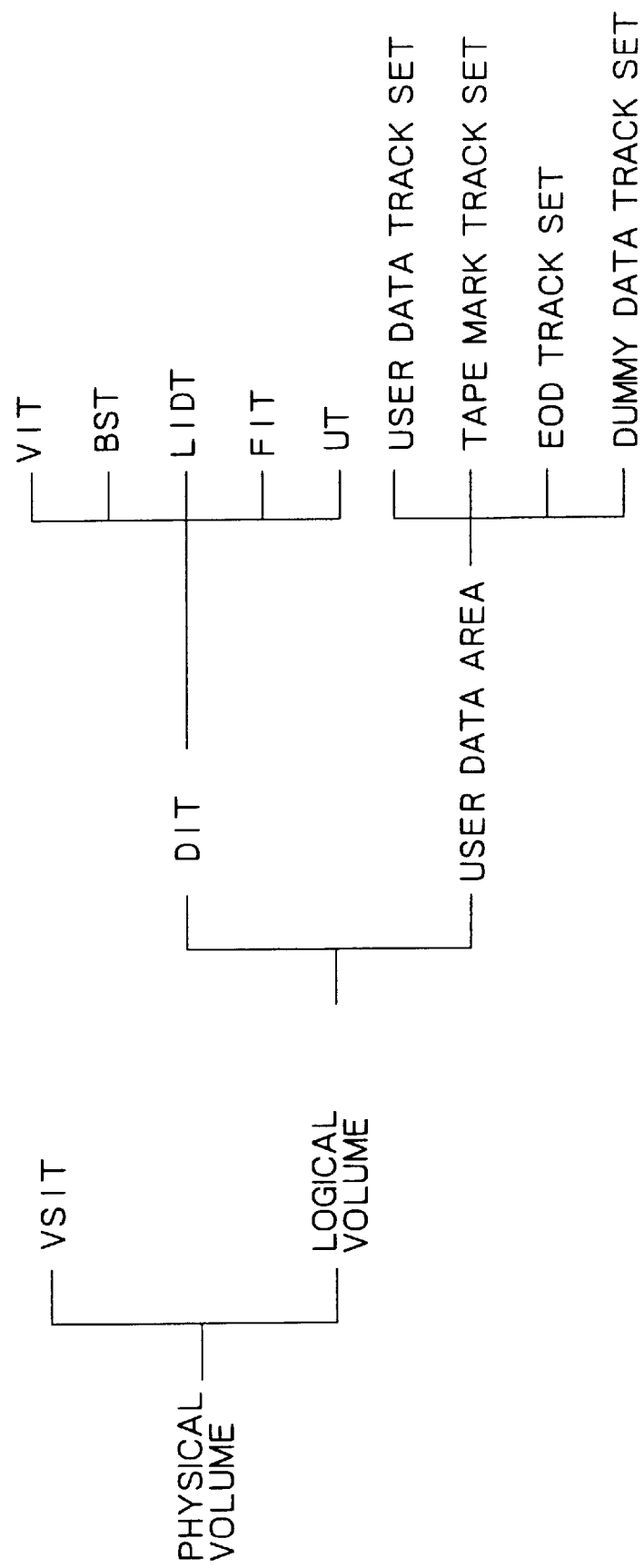
FIG. 13 is a diagrammatic view illustrating a relationship between a physical volume and track sets.

FIG. 13 illustrates a relationship of the VSIT and so forth in the physical volume and the logical volumes. The tape streamer 3 records user data onto a magnetic tape and plays back user data recorded on the magnetic tape in accordance with the configuration illustrated in FIG. 13.

1-2-1. General Configuration of the Tape Streamer

Figure 14:
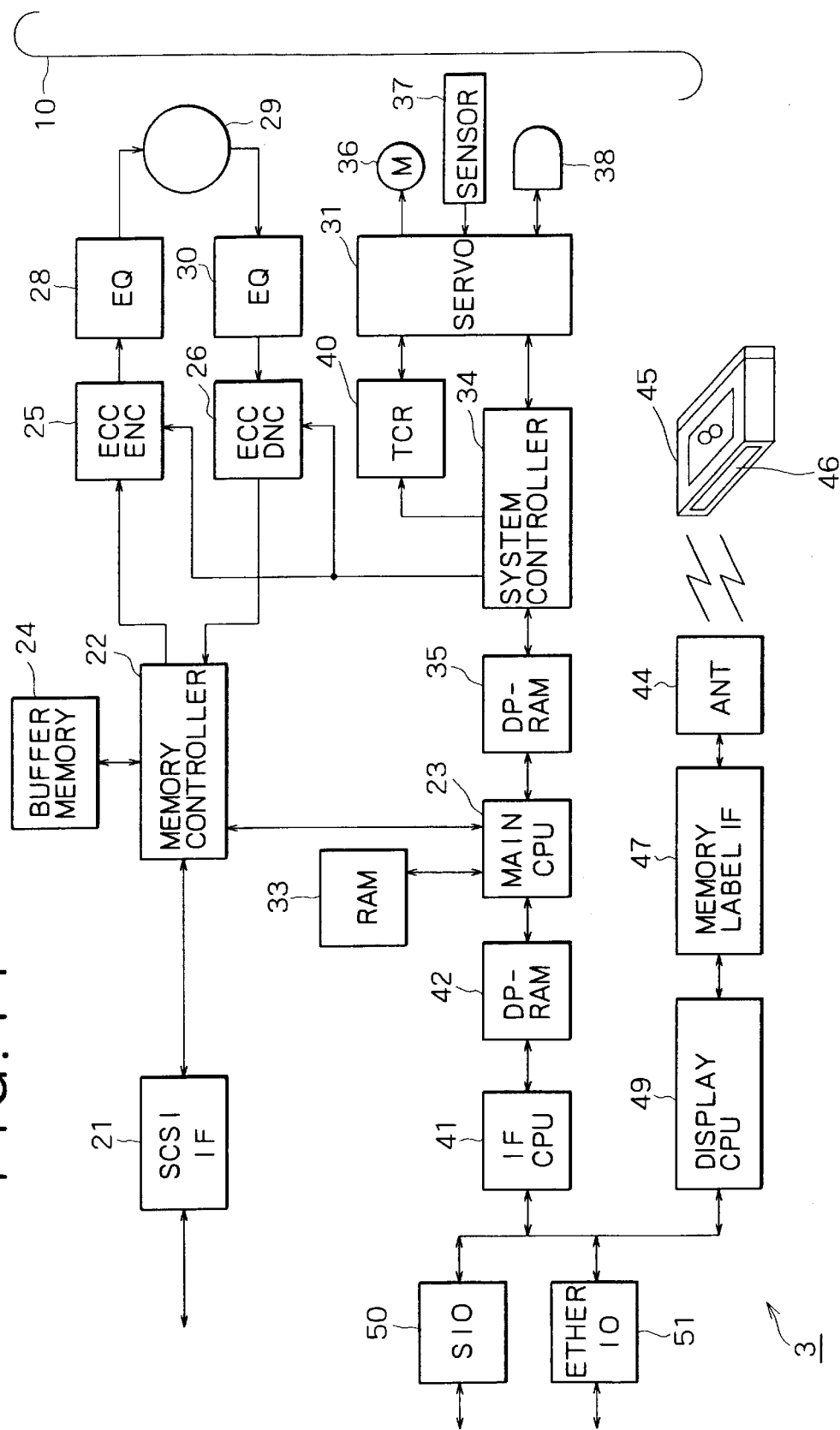
FIG. 14 is a block diagram showing the tape streamer of FIGS. 3A and 3B.

FIG. 14 shows a configuration of the tape streamer 3 which uses such a format as described above. Referring to FIG. 14, the tape streamer 3 includes a SCSI interface (SCSIIF) 21 connected to the CPU unit 5 by a SCSI interface. If the CPU unit 5 is not used, then the SCSI interface 21 is connected directly to a host computer. The SCSI interface 21 receives user data to be recorded and outputs the user data to a memory controller 22, and outputs played back data outputted from the memory controller 22 to the host computer. The SCSI interface 21 sends a command from the CPU unit 5 or the host computer 8 to a main CPU 23 through the memory controller 22. Further, the SCSI interface 21 receives status data or the like outputted from the main CPU 23 through the memory controller 22 and outputs the status data and so forth to the host computer 8 or the CPU unit 5.

The memory controller 22 temporarily stores user data inputted thereto through the SCSI interface 21 into a buffer memory 24 and outputs the data stored in the buffer memory 24 at a timing suitable for processing of an ECC encoder (ECCENC) 25 connected thereto. It is to be noted that the memory controller 22 receives data of a block management table and a DIT and so forth described hereinabove from the main CPU 23 and temporarily stores them into the buffer memory 24, and then outputs them to the ECC encoder 25. Conversely, upon playback, the memory controller 22 temporarily stores user data and so forth outputted from an ECC decoder (ECCDEC) 26 into the buffer memory 24 at a timing synchronized with processing of the gags ECC decoder 26, and outputs the stored user data to the SCSI interface 21. Further, the memory controller 22 outputs data of a DIT and so forth described above outputted from the ECC decoder 26 to the main CPU 23. Furthermore, the memory controller 22 issues a notification of a result of error detection inputted thereto together with user data to the main CPU 23 upon accessing of the main CPU 23.

The buffer memory 24 processes user data successively inputted thereto with a bank structure in a unit of a capacity corresponding to a predetermined number of track sets described hereinabove and thereby forms a bank memory. Consequently, the tape streamer 3 executes recording and/or playback processing and retrying processing in a processing unit of one bank formed in the buffer memory 24. Therefore, where user data of a data amount smaller than that of one bank are to be recorded on a track set, a dummy track set in which dummy data are recorded in place of user data is formed.

The ECC encoder 25 produces and adds error correction codes and adds a synchronizing pattern and so forth to data outputted from the memory controller 22 to form an ECC block described hereinabove with reference to FIG. 6. Further, the ECC encoder 25 outputs data of the ECC block in a plurality of systems corresponding to an arrangement of magnetic heads. Furthermore, the ECC encoder 25 outputs such data in a predetermined order to execute such processing as inter-track interleaving and word interleaving.

An equalizer 28 converts data outputted in a plurality of systems corresponding to an arrangement of recording heads from the ECC encoder 25 into a serial data string and modulates the serial data string in accordance with a method suitable for recording onto the magnetic tape 10. Thus, the equalizer 28 produces drive signals to be used for driving the recording heads and drives the recording heads mounted on a rotary drum 29 with the drive signal.

The recording heads of predetermined systems and playback heads which scan scanning loci of the recording heads are disposed on the rotary drum 29, and the rotary drum 29 rotates at a predetermined speed under the control of a servo circuit 31. Consequently, the tape streamer 3 can successively form slant tracks on a magnetic tape 10 which is fed at a predetermined speed to record user data and so forth onto the magnetic tape 10 and can monitor a result of the recording by means of the playback heads.

Another equalizer 30 receives, upon recording and upon playback, playback signals from the playback heads carried on the rotary drum 29 and waveform equalizes and demodulates the playback signals to play back data recorded on the magnetic tape 10.

The ECC encoder 25 takes in output data of the equalizer 30 and corrects errors of the output data with error correction codes added upon recording. Further, the ECC decoder 26 outputs the user data and so forth obtained by such error correction together with an error detection result representative of a result of the error correction to the memory controller 22. Consequently, the tape streamer 3 outputs the data recorded on the magnetic tape 10 to the host computer 8 through the buffer memory 24 and can acquire data of the VSIT and so forth by the main CPU 23 when necessary.

Further, the ECC decoder 26 notifies the main CPU 23 of the error detection result obtained in this manner through the buffer memory 24 so that it can execute such processing as retrying under the control of the main CPU 23 when necessary. It is to be noted that, upon recording of user data, the ECC decoder 26 merely executes a process of error correction and records an error detection result obtained by the process into the buffer memory 24 together with user data and so forth so that, in the subsequent read-after-write process, it can discriminate whether or not the recorded data can be played back correctly. It is to be noted that the ECC decoder 26 stores such an error detection result as just described as a set state of a corresponding error flag into the buffer memory 24.

The main CPU 23 includes, as a principal component thereof, a central processing unit which assures a working area in a random access memory (RAM) 33 and executes a predetermined processing procedure in accordance with a command inputted thereto through the SCSI interface 21, and controls operation of the entire tape streamer 3 and notifies the host computer 8 of a status when necessary. Further, in this processing, the main CPU 23 accesses the buffer memory 24 when necessary to acquire information such as the VSIT, a DIT or the like played back from the magnetic tape 10 and controls operation of a driving system for the magnetic tape 10 and so forth with reference to the acquired information. Further, after user data are recorded, the main CPU 23 controls operation of the entire tape streamer 3 to rewrite the corresponding DIT and the VSIT.

A system controller 34 exchanges data with the main CPU 23 through a dual port RAM (DP-RAM) 35 to control operation of the mechanism section of the tape streamer 3. In particular, in the tape streamer 3, a sensor 37 is disposed at the cassette slot or the like, and detects, for example, whether it is possible to load a magnetic tape 10 into the tape streamer 3 and notifies the servo circuit 31 of a result of the detection. A capstan motor (M) 36 drives the magnetic tape 10 to run under the control of the servo circuit 31. A stationary head 38 forms the longitudinal tracks 10A and 10B on the magnetic tape 10 and outputs playback signals of the longitudinal tracks 10A and 10B to the servo circuit 31.

The servo circuit 31 drives a predetermined drive system to execute such processes as loading, discharging and so forth of a tape cassette 45 in response to a result of detection of the tape cassette 45 by the sensor 37 and execute such processing as loading, unloading and so forth of a magnetic tape 10. Further, the servo circuit 31 drives the rotary drum 29 to rotate and controls the speed of rotation of the capstan motor 36 based on a result of discrimination of a result of playback of the control track 10A with reference to a phase of rotation of the rotary drum 29 thereby to execute a tracking control process. It is to be noted that, upon playback, the servo circuit 31 executes a tracking control process with reference to a pilot control signal for tracking control allocated to the slant tracks of the magnetic tape 10.

In order to initialize a magnetic tape 10, the servo circuit 31 drives the stationary head 38 while the magnetic tape 10 is fed at a predetermined feeding speed to form the longitudinal tracks 10A and 10B on the magnetic tape 10. Further, the servo circuit 31 processes a playback signal obtained from the stationary head 38 to play back management data and outputs the management data to the system controller 34. It is to be noted that the servo circuit 31 outputs a time code allocated to the management data to a time code recorder (TCR) 40.

In the initialization process, the time code recorder 40 successively produces and outputs a time code to the servo circuit 31, and the servo circuit 31 produces management data in accordance with the time code and various data outputted from the system controller 34 and drives the stationary head 38 with the management data. On the other hand, upon recording and upon playback, the time code recorder 40 converts the time code obtained from the servo circuit 31 into a track set ID and outputs the track set ID.

The system controller 34 controls such operation of the servo circuit 31 and outputs a track set ID outputted from the time code recorder 40 through the main CPU 23 to the ECC encoder 25 and so forth.

An interface CPU (IFCPU) 41 exchanges data with the main CPU 23 through a DP-RAM 42 to acquire information of a tape cassette 45 on the rack 6A or the elevator 6B. Further, the interface CPU 41 can communicate data with another computer system.

In particular, in the tape streamer 3, a reader-writer transmits a radio wave of an IC (Integrated Circuit) tag 46 disposed on the rear face of a tape cassette 45 from an antenna (ANT) 44. If a response from the IC tag 46 is received in response to the radio wave, then the reader-writer communicates various kinds of information relating to the tape cassette 45 with the IC tag 46. It is to be noted that each tape cassette 45 has, in addition to the IC tag 46, a bar code as an identification code thereof adhered thereto.

A display CPU 49 inputs and outputs data to be communicated with an IC tag through a memory label interface 47 to and from the interface CPU 41. Further, the display CPU 49 displays various data on a predetermined screen thereof in response to data inputted thereto through the interface CPU 41. It is to be noted that the display in this instance includes a display of information of a tape cassette 45 loaded in the tape streamer 3.

An serial interface (S10) 50 is a serial interface, for example, of the RS-232C, RS-422 or the like and transmits and receives information for maintenance to and from an external apparatus. An ethernet interface (ethernet IO) 51 is an interface for an ethernet and can transmit and receive various kinds of information when it is connected to a predetermined network.

1-2-1. Unloading Process

Figure 15:
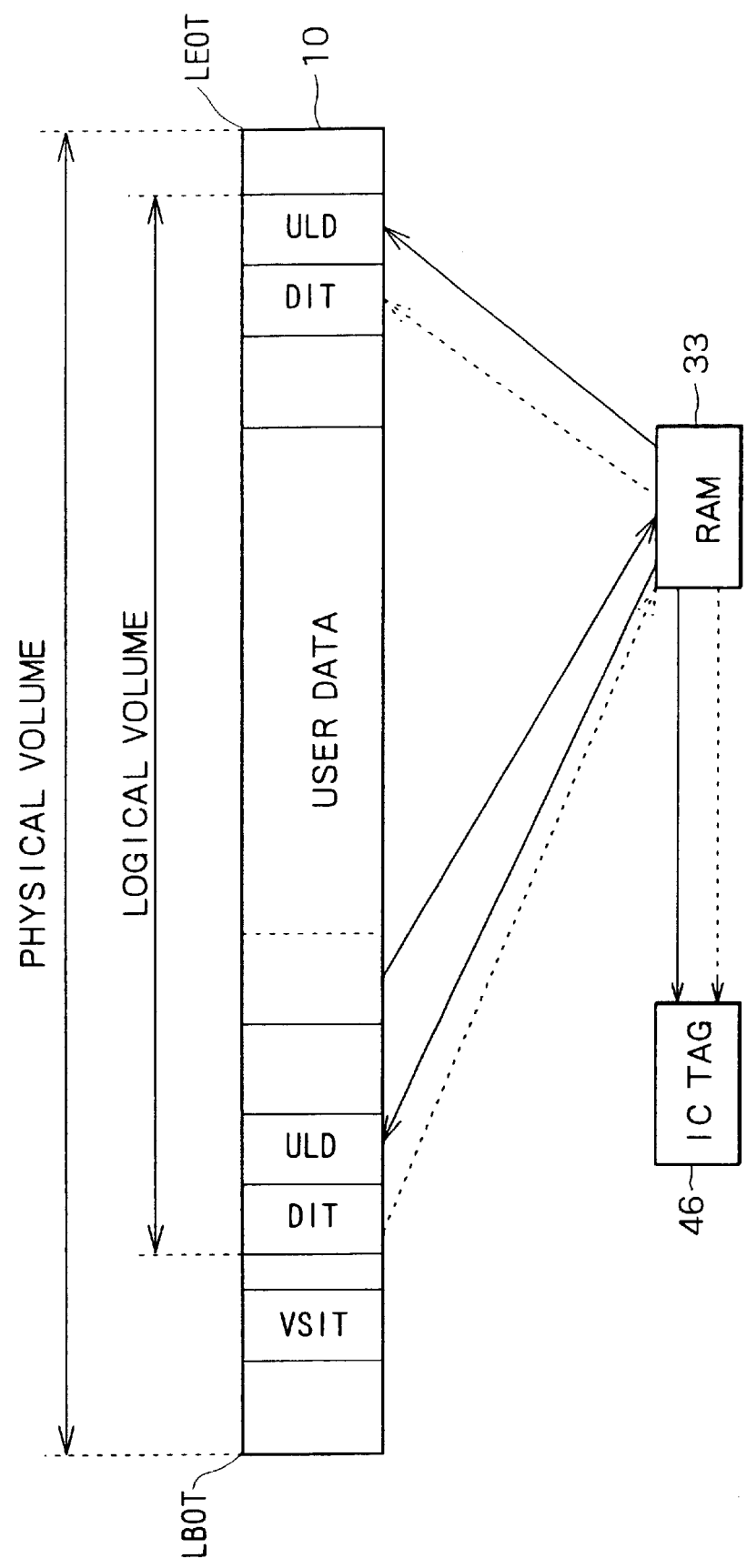
FIG. 15 is a diagrammatic view illustrating an unloading area used by the tape streamer of FIGS. 3A and 3B.

FIG. 15 illustrates a configuration of the magnetic tape 10 relating to loading and unloading processes together with associated configurations. Referring to FIG. 15, in the magnetic tape 10 shown, outer areas of the physical volume at the top and the tail of the magnetic tape 10 are allocated to unloading areas, and the magnetic tape 10 is loaded into and unloaded from the tape streamer 3 using the unloading area at the top or the tail of the magnetic tape 10. Corresponding to this, data necessary for accessing to the magnetic tape 10 and predetermined unloading data ULD are recorded at an end location of each of the logical volumes on the tail side of the magnetic tape 10.

The data necessary for accessing include at least data of the DIT described hereinabove. Consequently, if the magnetic tape 10 is unloaded on the tail side thereof and then loaded, then even if the VSIT and the DIT recorded at the top of the magnetic tape 10 are not played back every time, accessing to the magnetic tape 10 can be started and desired data can be additionally recorded on the magnetic tape 10. In this instance, since recording of the physical ID of a logical volume of the magnetic tape 10 is allocated to the DIT as described above, in the present embodiment, directory information of the magnetic tape 10 is recorded at a predetermined position of the magnetic tape 10 other than the top of it.

Meanwhile, the unloading data ULD are formed from predetermined user data recorded on the magnetic tape 10 and are suitably recorded immediately after the DIT recorded at the top of the magnetic tape 10.

To the predetermined user data recorded on the magnetic tape 10, an identification code and so forth of the magnetic tape 10 recorded by an application program of the host computer 8 in the top area of the user area (that is, data for management of the application program) are allocated. Consequently, if the application program initially issues an instruction to play back such identification codes recorded in the top area of the user data of the magnetic tape 10, then irrespective of whether the magnetic tape 10 is loaded on the tail side or on the top side thereof, data desired by the application program can be provided in a short time to the host computer 8. Consequently, the time required for accessing the magnetic tape 10 can be reduced as much when compared with that of the prior art.

Further, to the unloading data ULD, position information representative of an original recorded position of user data recorded in this manner is allocated in the form of a track set ID. Consequently, the tape streamer 3 can discriminate whether or not the user data allocated to the unloading data ULD of the magnetic tape 10 are data complying with access information by a request of a host apparatus.

Further to the unloading data ULD, information for specifying a discharging position of the magnetic tape 10 is allocated. The information here is set so as to correspond to a count value representative of the speed of rotation of the reel motor so that, directly after the magnetic tape 10 is loaded into the tape streamer 3, the exposition of the magnetic tape 10 can be discriminated immediately.

Furthermore, to the unloading data ULD, information of the used number of times representative of what number of times the magnetic tape 10 has been loaded into a tape streamer is allocated so that the life of the magnetic tape 10 can be estimated.

In the backup system 1, when a magnetic tape 10 is loaded, the DITs and the ULDs of the magnetic tape 10 are expanded in the random access memory 33 of the tape streamer 3, and the DITs and the ULDs stored in the random access memory 33 are thereafter updated so as to be ready for accessing of the magnetic tape 10. Further, if an unloading instruction of the magnetic tape 10 is issued, then the magnetic tape 10 is fast fed or rewound to the unloading area of the tail side or the head side nearer to the current position of the magnetic tape 10, and the DIT or the unloading data ULD on the tail side or the top side of the magnetic tape 10 is updated so as to be ready for recording of the random access memory 33. Furthermore, data of the DITs, a number of times by which the smaller amount of data is used among the ULDs and the discharging position are recorded into the IC tag 46 disposed on the tape cassette 45 for the magnetic tape 10.

From the foregoing, in the backup system 1, whether a magnetic tape 10 is in storage or is being transported, the volume label or the like of the magnetic tape 10 can be confirmed by the reader-writer disposed on the rack 6A or the elevator 6B and utilized for management of the magnetic tape 10, and a DIT and so forth of the magnetic tape 10 can be detected before the magnetic tape 10 is loaded into the equalizer 30.

To this end, the central processing unit 5C (FIG. 2) which controls operation of the entire backup system 1 acquires records of the IC tag 46 of each tape cassette 45 by means of the reader-writer disposed on the rack 6A and prepares and stores a virtual file system including, for each storage place of the rack 6A, a tape volume of a tape cassette 45 accommodated in the place, files recorded in the tape cassette 45 and so forth. Furthermore, the central processing unit 5C acquires unloading data described above from the tape streamer 3, acquires identification codes from the bar code reader disposed on the rack 6A and produces management data from the acquired unloading data and identification codes in association with the virtual file system.

The central processing unit 5C can utilize the management data based on the virtual file system to load a desired magnetic tape 10 into the tape streamer 3 in response to an operation of an operator and transfer data, for example, to a backup center or the like at a remote place and can be utilized for further various kinds of management.

Further, the central processing unit 5C (FIG. 2) can acquire, at a predetermined timing, records of the IC tag 46 and an identification code of the bar code of each tape cassette 45 from the reader-writer disposed on the rack 6A, compares the acquired records and identification code with the stored management data of the virtual file system, and loads, if records of an IC tag or an identification code different having contents different from the records in the past are detected, the tape cassette 45 into the tape streamer 3 making use of a free time in response to an operation of the operator to confirm the contents of the IC tag of the tape cassette 45. In this manner, the backup system 1 prevents wrong arrangement of a tape cassette 45, wrong attachment of an IC tag, wrong attachment of a bar code and so forth by an operator.

Further, if placement of a tape cassette 45 onto the rack 6A is detected by a switch disposed at an accommodation position of the rack 6A, then the central processing unit 5C similarly executes a comparison process with the stored management data of the virtual file system. Also when a tape cassette 45 is unloaded and placed onto the rack 6A, the central processing unit 5C drives the reader-writer disposed on the elevator 6B or drives the reader-writer and the bar code reader disposed on the rack 6A to acquire such data as described above or else acquires such data from the tape streamer 3 and updates the stored virtual file list and so forth.

On the contrary, when a tape cassette 45 is transported from the rack GA and loaded into the tape streamer 3, the DITs are acquired from the management data of the stored virtual file during transportation or from an IC tag of the tape cassette 45, and a notification of completion of loading is issued to the host apparatus. Consequently, the backup system 1 executes a succeeding process of the host apparatus until a command is issued and another process of transporting the tape cassette 45 and loading the magnetic tape 10 simultaneously and parallelly. Therefore, the time required to issue a command after a notification of completion of the loading process is issued can be reduced as much.

Also in this processing, the tape streamer 3 can drive the reader-writer disposed on the elevator 6B or drives the reader-writer and the bar code reader disposed on the elevator 6B to compare records of the IC tag and the bar code with the stored information so that, even in such a case that a tape cassette 45 accommodated on the rack 6A is exchanged, for example, while the power supply stops, a tape cassette 45 desired by the host apparatus can be loaded with certainty.

Figure 16:
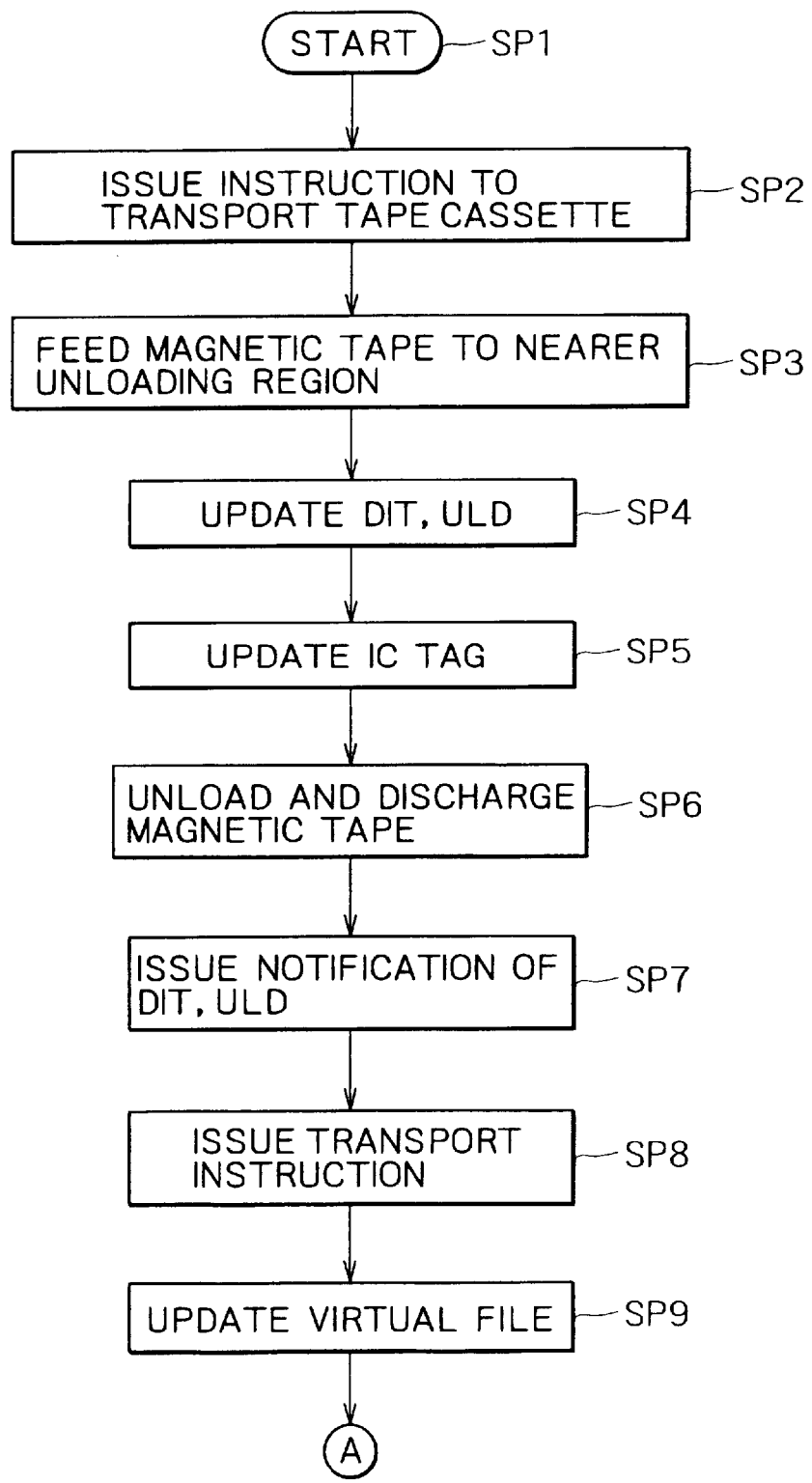
FIGS. 16 and 17 are flow charts illustrating a processing procedure of a central processing unit of a CPU unit shown in FIG. 2.
Figure 17:
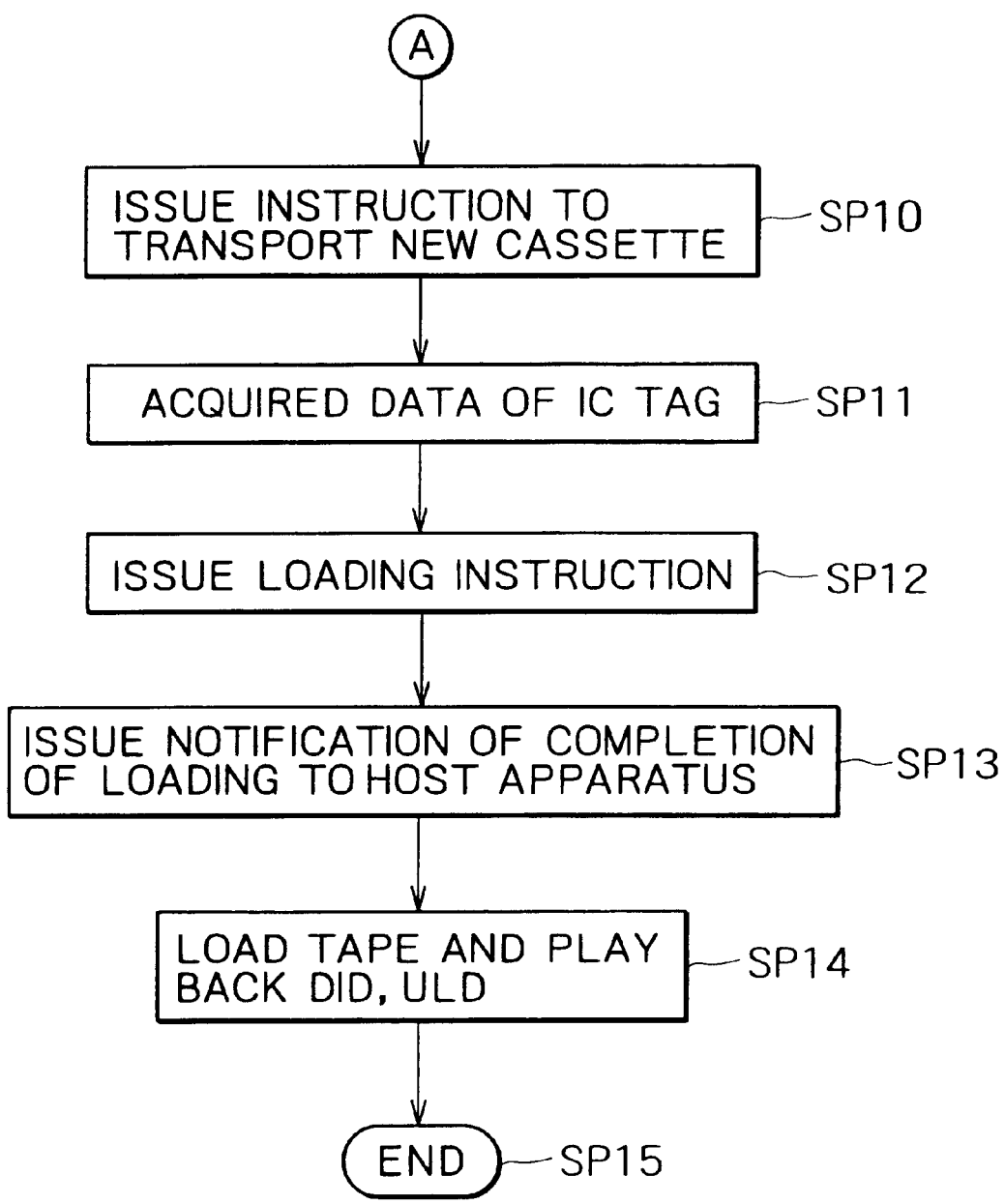

FIGS. 16 and 17 illustrate a processing procedure of the central processing unit 5C of the CPU unit 5 and the main CPU 23 of the tape streamer 3 when a tape cassette 45 is unloaded from the tape streamer 3 and exchanged.

Referring first to FIG. 16, in the processing procedure illustrated, if an instruction to load a magnetic tape different from another magnetic tape loaded at present is received from the host computer 8 (step SP1), then the processing of the central processing unit 5C of the CPU unit 5 advances from step SP1 to step SP2, in which the central processing unit 5C accepts the command from the host computer 8 and issues an unloading instruction of the magnetic tape 10 to the tape streamer 3.

Then in next step SP3, the main CPU 23 of the tape streamer 3 detects that one of the unloading areas on the top side and the tail side of the magnetic tape 10 which is nearer to the current position of the magnetic tape 10, and causes feeding of the magnetic tape 10 at a high speed to be started toward the detected unloading area. In response to this, the main CPU 23 updates the position information of the discharging information in the unloading data ULD stored in the random access memory 33.

Then, the processing advances to step SP6, in which the main CPU 23 causes the feeding speed of the magnetic tape 10 to be changed over to a feeding speed for recording or playback at a position immediately prior to the recorded position of the DIT or the unloading data ULD, and updates the DIT and the unloading data ULD with the data stored in the random access memory 33. In this instance, when the magnetic tape 10 is loaded, the main CPU 23 acquires the DIT and the unloading data ULD from the magnetic tape 10 and stores them into the random access memory 33, and if records of the magnetic tape 10 are updated, then the main CPU 23 updates the information stored in the random access memory 33.

Then, the main CPU 23 updates the records of the DIT recorded in the IC tag 46 through the display CPU 49. Then in step SP6, the magnetic tape 10 is unloaded at the unloading area of the magnetic tape 10 and the tape cassette 45 is discharged under the control of the servo circuit 31. Thus, the tape streamer 3 re-records information necessary for accessing to the magnetic tape 10 and predetermined user data recorded on the magnetic tape 10 into a predetermined area in the proximity of the unloading area.

Thereafter, the processing advances to step SP7, in which the main CPU 23 notifies the CPU unit 5 of the discharging of the tape cassette 45, the DIT and the unloading data ULD. In response to the notification, the central processing unit 5C of the CPU unit 5 instructs the transport mechanism to transport the tape cassette 45 to its original accommodation position in accordance with the virtual file stored in the central processing unit 5C. Further, when a notification of completion of the transportation of the tape cassette 45 is received, the central processing unit 5C updates, in next step SP9, the records of the virtual file and so forth so as to correspond to the accommodation of the tape cassette 45 of the rack 6A, whereafter the processing advances to step SP10 of FIG. 10. Thus, in this instance, the central processing unit 5C updates the records of the virtual file and so forth in response to a notification from the tape streamer 3.

Referring now to FIG. 17, the central processing unit 5C detects, in step SP10, the accommodation position of another tape cassette 45 to be played back newly designated by the host computer 8 in accordance with the virtual file, and instructs the transport mechanism to transport the tape cassette 45 accommodated in the accommodation position to the tape streamer 3. It is to be noted that, in this instance, if it is discriminated based on the data of the number of times of use recorded together with the virtual file that the loading instruction is for a tape cassette 45 for which loading has been performed repetitively by more than a predetermined number of times, then the central processing unit 5C issues an alarming notification to the operator.

Then in step SP11, the central processing unit 5C drives the reader-writer disposed on the elevator 6B to acquire the DIT recorded in the IC tag 46 of the tape cassette 45 being transported and compares the DIT with the virtual file. If the comparison indicates a result that the DIT does not coincide with the record of the virtual file, then the central processing unit 5C notifies the operator of this and executes a comparison process in the case of incoincidence described above in response to an instruction of the operator.

Then, if a notification of completion of the transportation of the tape cassette 45 is received from the transportation direction, then the central processing unit 5C advances its processing to step SP12, in which it issues an instruction to the tape streamer 3 to load the magnetic tape 10. At this time, the central processing unit 5C notifies the tape streamer 3 of the DIT recorded as the virtual file and relating part of the unloading data.

Then in next step SP13, even if a notification of completion of loading is not received from the tape streamer 3 as yet, the central processing unit 5C issues a notification of loading to the host computer 8. Thus, in the present backup system 1, succeeding processing of the host computer 8 and processing of actual loading are executed simultaneously and parallelly, and the time required for accessing to the magnetic tape 10 can be reduced as much.

In this instance, the main CPU 23 on the tape streamer 3 side loads, in step SP14, the magnetic tape 10 in accordance with the loading instruction received in step SP13 and plays back and records the DIT and the unloading data ULD. In this processing, the main CPU 23 loads the records of the IC tag 46 of the loaded magnetic tape 10 and compares the notification from the central processing unit 5C with the loaded records under the control of the display CPU 49. Further, the main CPU 23 executes similar comparison processing with the DIT and the unloading data ULD obtained by actually playing back the magnetic tape 10, and if the comparison indicates an incoincident result, then the main CPU 23 notifies the operator of this and executes a predetermined processing procedure in accordance with an instruction issued from the operator.

Further, when the unloading data ULD is recorded into the memory 33, the main CPU 23 counts up and records the data of the number of times of use. Further, the main CPU 23 notifies the servo circuit 31 of position information of a discharging position received from the IC tag 46 or the central processing unit 5C and sets the count value of the tape counter of the servo circuit 31 to the count value at the present position of the tape cassette 45.

Consequently, after the magnetic tape 10 is loaded, the main CPU 23 can immediately start playback of the nearest DIT and unloading data ULD. Thus, the time required for playback of the data described above from the magnetic tape 10 can be reduced as much.

After the loading of the magnetic tape 10 is completed in this manner, the main CPU 23 and the central processing unit 5C advance the processing to step SP15, in which they ends the processing procedure.

The first command issued from the host computer 8 after the magnetic tape 10 is loaded in this manner is in most cases a command for playing back the identification code of the magnetic tape 10 and so forth recorded at the top of the user area of the magnetic tape 10. If a command of the type is inputted, then the main CPU 23 of the tape streamer 3 discriminates based on data which specify an object of playback set in the command whether or not the object of playback is data relating to unloading data ULD. Further, if the object of playback is an identification code of the magnetic tape 10 or the like recorded at the top of the user area, then the main CPU 23 notifies the host computer 8 of the data stored in the random access memory 33 in place of playback of the magnetic tape 10.

It is to be noted that the tape streamer 3 may be connected to and used together with the host computer 8 without the intervention of the CPU unit 5. In this instance, the operation mode is changed such that the notification and comparison processes of the tape streamer 3 through the cooperation with the central processing unit 5C based on the virtual file described hereinabove are omitted. In other words, the tape streamer 3 loads a tape cassette 45 inserted manually by the operator in accordance with an instruction from the host computer 8. In this instance, the main CPU 23 notifies the host computer 8 of completion of loading before the loading is completed thereby to reduce the time required before accessing is started. Further, the tape streamer 3 reads out records of the IC tag, reads out the DIT and the unloading data ULD in accordance with the records of the IC tag, and executes such processing as comparison between them and so forth. Furthermore, the tape streamer 3 returns data based on the played back unloading data ULD in response to a request from the host computer 8 to reduce the accessing time.

2. Operation of the Embodiment

In the backup system 1 having the configuration described above (FIGS. 1 and 2), a tape cassette 45 accommodated on the rack 6A is loaded into the tape streamer 3 under the control of the CPU unit 5 in accordance with an instruction of the host computer 8, and user data outputted from the host computer 8 are recorded onto the magnetic tape 10 of the tape cassette 45 by the tape streamer 3, and then the data recorded on the magnetic tape 10 are played back and outputted to the host computer 8. Consequently, the backup system 1 can be used for backup and so forth of the host computer 8.

In particular, user data outputted from the host computer 8 are inputted through the CPU unit 5 to the tape streamer 3, and error correction codes in the form of product codes are added to the user data by the ECC encoder 25 of the tape streamer 3 (FIGS. 6 and 14). Further, resulting data are inter-track interleaved and inter-word interleaved and successively recorded onto four tracks which form one track set of the magnetic tape 10 (FIG. 4). Further, the data are recorded in a unit of a bank set in the buffer memory 24 onto the magnetic tape 10.

In this instance, in the tape streamer 3 (FIGS. 5A and 5B), four recording tracks to be formed on the magnetic tape 10 are set to one track set, and the user data are successively recorded in a unit of, for example, 8 track sets corresponding to one bank under the bank control of the buffer memory 24. Further, the user data are recorded such that a logical ID, which has a successively increasing value, is set to each of track sets allocated to the user data so that the track set can be identified. In this instance, a predetermined management table and so forth are set to and recorded together with each track set ID (FIG. 7).

Upon playback, the user data are played back from the magnetic tape 10 with reference to the logical ID and so forth set in this manner, and then such processes as decoding, error correction and so forth are executed and resulting data are outputted to the host computer 8.

By the tape streamer 3, data necessary for accessing to the magnetic tape 10 are recorded in the VSIT and the DITs recorded on the outer sides of the logical volume and immediately after the start of the physical volume of the magnetic tape 10 (FIG. 8). In particular, the logical volume and so forth of the magnetic tape 10 can be detected from the VSIT, and a recording or playback position of a desired file can be confirmed and a free area of the magnetic tape 10 can be confirmed based on directory information and so forth (refer to FIGS. 10 to 13) recorded in the DITs. Consequently, a desired file can be accessed or can be recorded onto the magnetic tape 10 (FIG. 9).

The tape streamer 3 records the DIT also at the tail of the magnetic tape 10 in addition to the top area of the magnetic tape 10. Furthermore, when the tape streamer 3 unloads the magnetic tape 10, if the current position of the magnetic tape 10 is nearer to the top side of the magnetic tape 10, then the tape streamer 3 rewinds the magnetic tape 10 to the top side and updates the DIT on the top side of the magnetic tape 10, whereafter the tape streamer 3 unloads the magnetic tape 10 at the unloading area of the top side. On the other hand, if the current position of the magnetic tape 10 is nearer to the tail side of the magnetic tape 10, then the tape streamer 3 fast feeds the magnetic tape 10 to the tail side and updates the DIT on the tail side, whereafter it unloads the magnetic tape 10 at the unloading area of the tail side (FIG. 15).

Consequently, in the backup system 1, since the magnetic tape 10 is unloaded in that one of the unloading areas which is set nearer to the current position, the magnetic tape 10 can be unloaded in a shorter time than ever.

Since a DIT is recorded at a position of the magnetic tape 10 in the proximity of a portion at which the magnetic tape 10 is unloaded in this manner, when the magnetic tape 10 unloaded in this manner is loaded again, a portion of the magnetic tape 10 in the proximity of the loaded portion can be played back to acquire directory information and so forth of files recorded on the magnetic tape 10. Consequently, even if the DIT recorded at the top of the magnetic tape 10 is not played back intentionally, a request of the host computer 8 can be satisfied.

When the magnetic tape 10 is unloaded, the tape streamer 3 records, in addition to the DIT, unloading data ULD including data of identification codes and so forth recorded at the top of the user area, data of original recorded positions of the data and other necessary data. Consequently, when the magnetic tape 10 is loaded again, part of the user data are recorded again so that data designated to be played back first by many application programs can be acquired simultaneously with the DIT. Consequently, in the present backup system, when accessing to the magnetic tape 10 is started by an application program, a command of the application program can be executed even if the magnetic tape 10 is not rewound to the top thereof intentionally, and the time required for accessing to the magnetic tape 10 can be substantially reduced as much.

Furthermore, in the present embodiment, the DIT, information of the number of times of loading of a magnetic tape and information of a discharging position from within information to be recorded upon such unloading are recorded into the IC tag 46 disposed on the tape cassette 45. Further, data recorded on such IC tags and data of bar codes are recorded for individual rack positions into the CPU unit 5. Consequently, in the backup system 1, even if a magnetic tape 10 is not loaded into the tape streamer 3 to play back the DIT from the magnetic tape 10, directory information of the magnetic tape 10 cannot be acquired.

Further, since a reader-writer for reading data of the IC tag 46 disposed on the tape cassette 45 and a bar code reader for reading a bar code are disposed on the rack 6A, and since a reader-writer is disposed on the elevator 6B and the tape streamer 3, directory information of the magnetic tape 10 can be acquired by driving any of the reader-writers and the bar code reader even if the magnetic tape 10 is not loaded into the tape streamer 3 to play back the DIT from the magnetic tape 10.

Consequently, in the backup system 1, if an instruction to load a magnetic tape is received from the host computer 8, then processes of acquiring directory information of the corresponding tape cassette 45 from the information obtained from the reader-writer or the data stored in the CPU unit 5, issuing a notification of completion of the loading to the host computer 8 before the loading of the magnetic tape 10 into the tape streamer 3 is completed and issuing a command from the host apparatus and a loading process of the tape streamer 3 can be executed simultaneously and parallelly. Consequently, in the backup system 1, the time required for accessing to the magnetic tape 10 can be further reduced.

Since data of the type described are recorded into an IC tag in this manner and besides a bar code is disposed on each tape cassette 45, even if a tape cassette 45 on the rack 6A in the backup system 1 is changed by the operator, the exchange of the tape cassette 45 can be detected by the reader-writer and the bar code reader, and records of the IC tag can be read or the tape cassette 45 can be loaded into the tape streamer 3 to read a DIT and so forth to use the tape cassette 45. In other words, operation of the operator by exchange of a tape cassette 45 can be simplified.

Further, since the number of times of loading which is the number of times of use is used as data to be recorded into such an IC tag as described above, for example, when a tape cassette 45 is accommodated onto the rack or the like, the life of the magnetic tape 10 can be indicated to the operator before the tape cassette 45 is loaded into the tape streamer 3. Also this can simplify the management of the tape cassette 45.

Furthermore, since a DIT recorded on the magnetic tape 10 is recorded in an overlapping manner in the CPU unit 5 and the IC tag, it is possible to compare the data of them to prevent an operation error of the backup system 1 and so forth. Consequently, reliability higher as much can be assured.

3. Advantages of the Embodiment

With the backup system 1 having the configuration described above, since part of user data recorded on a magnetic tape are recorded at a predetermined position of the magnetic tape in addition to a DIT which is data necessary for accessing to the magnetic tape and then the magnetic tape is discharged, the time required for accessing to the magnetic tape can be reduced significantly when compared with the prior art.

Further, where the part of the user data are data recorded in the top region of the user area of the magnetic tape, data which correspond to a command issued at an initial stage to the tape streamer from many application programs can be played back in the proximity of a loading position of the magnetic tape. Consequently, the time required for accessing can be reduced as much.

Where at least part of the information recorded at the predetermined position is recorded into the IC tag disposed on the tape cassette 45, management of the magnetic tape can be simplified.

Further, where position information of the original recorded position of the part of the user data described above is recorded additionally into the IC tag disposed on the tape cassette 45, the part of the user data recorded in the proximity of the loading position of the magnetic tape can be played back and outputted based on the position information in place of accessing to the original user data. Consequently, the time required for accessing can be reduced as much.

Further, where the position information of a discharging position of the magnetic tape is recorded additionally into the IC tag, current position information at the point of time of completion of loading can be acquired before the magnetic tape is loaded. Also this can reduce the time required for accessing.

Furthermore, where information of the number of times of loading of the magnetic tape is recorded additionally into the IC tag, the maintenance operation of the magnetic tape can be simplified.

4. Other Embodiments

It is to be noted that, in the embodiment described above, data of an identification code or the like recorded at the top of the user area is allocated as part of user data recorded in the proximity of an unloading area of a magnetic tape. However, the present invention is not limited to this, and the accessing time can be reduced even where user data accessing to which occurs in a comparatively high frequency is allocated instead.

Further, in the embodiment described above, the DIT and part of user data are recorded in the proximity of an unloading area of a magnetic tape. However, the present invention is not limited to this, and such data may be recorded repetitively in the unloading area.

Further, in the embodiment described above, the top and the tail of a magnetic tape are set to an unloading area. However, the present invention is not limited to this, but can be applied widely also where such an unloading area is set to various locations of a magnetic tape.

Furthermore, in the embodiment described above, virtual files and the like are stored in a CPU unit, and when the tape streamer is used by itself, such files are not prepared. However, the present invention is not limited to this, and such files may be prepared on the table streamer side such that, also when the tape streamer is used by itself, the tape cassettes 45 are managed based on the virtual files.

Further, in the embodiment described above, an IC tag is disposed on each tape cassette. However, the present invention is not limited to this, but can be applied widely also where an IC tag is not disposed on each tape cassette.

While preferred embodiments of the present invention have been described using specific terms, such description is for illustrative purposes only, and it is to be understood that changes and variations may be made without departing from the spirit or scope of the following claims.

What is claimed is:

1. A magnetic recording and playback apparatus for successively forming slant tracks on a magnetic tape and recording user data onto the slant tracks, comprising:

means for recording data necessary for accessing to the magnetic tape and part of the user data recorded on the magnetic tape at a predetermined position of the magnetic tape; and means for discharging the magnetic tape.

2. A magnetic recording and playback apparatus according to claim 1, wherein the part of the user data is data recorded in a top area of a user area of the magnetic tape.

3. A magnetic recording and playback apparatus according to claim 1, further comprising:

means operable upon loading of the magnetic tape for playing back and storing the data necessary for accessing to the magnetic tape recorded at the predetermined position of the magnetic tape;

means for accessing the magnetic tape based on the stored data necessary for accessing to the magnetic tape in accordance with an instruction from a host apparatus; and means for outputting the part of the user data to said host apparatus in accordance with an instruction from said host apparatus.

4. A magnetic recording and playback apparatus according to claim 1, further comprising means for recording at least part of the data to be recorded at the predetermined position into an IC tag held on a tape cassette for the magnetic tape.

5. A magnetic recording and playback apparatus according to claim 4, further comprising:

a storage rack for storing the magnetic tape;

a magnetic tape mechanism for loading and unloading the magnetic tape;

a transport mechanism for transporting the magnetic tape between said storage rack and said magnetic tape mechanism; and an accessing mechanism provided on said storage rack and/or said transport mechanism for accessing a memory of the IC tag.

6. A magnetic recording and playback apparatus according to claim 1, further comprising means for recording position information of an original recorded position of the part of the user data into an IC tag held on a tape cassette for the magnetic tape.

7. A magnetic recording and playback apparatus according to claim 1, further comprising means for recording position information of a discharging position of the magnetic tape into an IC tag held on a tape cassette for the magnetic tape.

8. A magnetic recording and playback apparatus according to claim 1, further comprising means for recording information of the number of times of loading of the magnetic tape into an IC tag held on a tape cassette for the magnetic tape.

9. A magnetic recording and playback method for successively forming slant tracks on a magnetic tape and recording user data onto the slant tracks, comprising the steps of:

recording data necessary for accessing to the magnetic tape and part of the user data recorded on the magnetic tape at a predetermined position of the magnetic tape; and discharging the magnetic tape.

10. A recording apparatus for recording user data onto tracks of a magnetic tape, comprising:

means for receiving an instruction to unload a magnetic tape cassette loaded in said recording apparatus from said recording apparatus; and means operable upon reception of the unloading instruction for recording information necessary for later accessing to the magnetic tape into an unloading position of the magnetic tape and a memory incorporated in the magnetic tape cassette.

11. A recording method for a recording apparatus for recording user data onto tracks of a magnetic tape, comprising the steps of:

receiving an instruction to unload a magnetic tape cassette loaded in said recording apparatus from said recording apparatus; and recording, upon reception of the unloading instruction, information necessary for later accessing to the magnetic tape into an unloading position of the magnetic tape and a memory incorporated in the magnetic tape cassette.

12. A recording apparatus for recording user data onto tracks of a magnetic tape, comprising:

means for receiving an instruction to unload a magnetic tape cassette loaded in said recording apparatus from said recording apparatus; and means operable upon unloading of the magnetic tape cassette in accordance with the unloading instruction for recording identification code data recorded at the top of a user area of the magnetic tape and unloading data representative of a recorded position of the identification code data into an unloading position of the magnetic tape and a memory incorporated in the magnetic tape cassette.

13. A recording method for a recording apparatus for recording user data onto tracks of a magnetic tape, comprising the steps of:

receiving an instruction to unload a magnetic tape cassette loaded in said recording apparatus from said recording apparatus; and recording, upon unloading of the magnetic tape cassette in accordance with the unloading instruction, identification code data recorded at the top of a user area of the magnetic tape and unloading data representative of a recorded position of the identification code data into an unloading position of the magnetic tape and a memory incorporated in the magnetic tape cassette.

14. A recording apparatus for recording user data onto tracks of a magnetic tape, comprising:

means for receiving an instruction to unload a magnetic tape cassette loaded in said recording apparatus from said recording apparatus; and means operable upon unloading of the magnetic tape cassette in accordance with the unloading instruction for storing information necessary for subsequent accessing to the magnetic tape and part of data recorded in a user area of the magnetic tape into an unloading position of the magnetic tape and a memory incorporated in the magnetic tape cassette so that data designated to be played back first by a plurality of application programs may be acquired.

15. A recording method for a recording apparatus for recording user data onto tracks of a magnetic tape, comprising the steps of:

receiving an instruction to unload a magnetic tape cassette loaded in said recording apparatus from said recording apparatus; and storing, upon unloading of the magnetic tape cassette in accordance with the unloading instruction, information necessary for subsequent accessing to the magnetic tape and part of data recorded in a user area of the magnetic tape into an unloading position of the magnetic tape and a memory incorporated in the magnetic tape cassette so that data designated to be played back first by a plurality of application programs may be acquired.

16. A recording apparatus for recording user data onto tracks of a magnetic tape, comprising:

means for receiving an instruction to unload a magnetic tape cassette loaded in said recording apparatus from said recording apparatus; and means operable upon unloading of the magnetic tape cassette in accordance with the unloading instruction for storing directory information table information representative of data necessary for subsequent accessing to the magnetic tape and unloading data information representative of part of data recorded in a user area of the magnetic tape into an unloading position of the magnetic tape and a memory incorporated in the magnetic tape cassette.

17. A recording method for a recording apparatus for recording user data onto tracks of a magnetic tape, comprising the steps of:

receiving an instruction to unload a magnetic tape cassette loaded in said recording apparatus from said recording apparatus; and storing, upon unloading of the magnetic tape cassette in accordance with the unloading instruction, directory information table information representative of data necessary for subsequent accessing to the magnetic tape and unloading data information representative of part of data recorded in a user area of the magnetic tape into an unloading position of the magnetic tape and a memory incorporated in the magnetic tape cassette.

* * * * *